United States Patent
Oi et al.

(10) Patent No.: US 12,031,655 B2
(45) Date of Patent: Jul. 9, 2024

(54) CONNECTOR

(71) Applicant: TOGO SEISAKUSYO CORPORATION, Aichi (JP)

(72) Inventors: Shigeo Oi, Aichi (JP); Yuya Kido, Aichi (JP); Shohei Hosokawa, Aichi (JP)

(73) Assignee: TOGO SEISAKUSYO CORPORATION, Aichi (JP)

( * ) Notice: Subject to any disclaimer, the term of this patent is extended or adjusted under 35 U.S.C. 154(b) by 38 days.

(21) Appl. No.: 17/916,675

(22) PCT Filed: Mar. 5, 2021

(86) PCT No.: PCT/JP2021/008712
§ 371 (c)(1),
(2) Date: Oct. 3, 2022

(87) PCT Pub. No.: WO2021/205794
PCT Pub. Date: Oct. 14, 2021

(65) Prior Publication Data
US 2023/0151915 A1   May 18, 2023

(30) Foreign Application Priority Data
Apr. 9, 2020   (JP) .................... 2020-070254

(51) Int. Cl.
*F16L 37/088*   (2006.01)
*F16L 37/14*   (2006.01)

(52) U.S. Cl.
CPC ......... *F16L 37/0885* (2019.08); *F16L 37/144* (2013.01)

(58) Field of Classification Search
CPC .............. F16L 37/0885; F16L 37/144
(Continued)

(56) References Cited

U.S. PATENT DOCUMENTS

2006/0214420 A1* 9/2006 Mori .............. F16L 37/0885
285/319
2007/0059972 A1* 3/2007 Rigollet ............ F16L 37/144
439/441
(Continued)

FOREIGN PATENT DOCUMENTS

DE   102006002565 A1   7/2007
EP       3267086 A1   1/2018
(Continued)

OTHER PUBLICATIONS

International Search Report received in PCT/JP2021/008712, date of mailing Apr. 27, 2021, 5 pages.
(Continued)

*Primary Examiner* — David Bochna
(74) *Attorney, Agent, or Firm* — Hayes Soloway PC

(57) ABSTRACT

A connector includes a connector body and a retainer. The connector body includes a first opening portion and a second opening portion. The retainer includes a first leg portion, a second leg portion, and an intermediate portion that is elastically deformable in an open manner so that a distance between the first leg portion and the second leg portion is widened. An end surface of the first opening portion includes a first guide surface that guides the first leg portion in a direction where the distance is widened when a force in an insertion direction is applied to the first leg portion. An end surface of the second opening portion includes a second guide surface that guides the second leg portion in a direction where the distance is widened when a force in an insertion direction is applied to the second leg portion.

2 Claims, 35 Drawing Sheets

(58) Field of Classification Search
USPC ........................................................ 285/317
See application file for complete search history.

(56) References Cited

U.S. PATENT DOCUMENTS

| | | | | |
|---|---|---|---|---|
| 2009/0008927 | A1* | 1/2009 | Binder | F16L 37/0885 |
| | | | | 285/33 |
| 2010/0032937 | A1* | 2/2010 | Kerin | F16L 37/144 |
| | | | | 285/3 |
| 2012/0104746 | A1 | 5/2012 | Fansler et al. | |
| 2017/0074444 | A1* | 3/2017 | Nezu | F16L 37/0885 |
| 2017/0363237 | A1* | 12/2017 | Pepe | F16L 37/144 |
| 2023/0366498 | A1* | 11/2023 | Nowicki | F16L 37/144 |

FOREIGN PATENT DOCUMENTS

| | | |
|---|---|---|
| JP | H0533891 A | 2/1993 |
| JP | 2001289381 A | 10/2001 |
| JP | 2005042794 A * | 2/2005 ............ F16L 37/144 |
| JP | 2005106241 A | 4/2005 |
| JP | 2009121668 A | 6/2009 |
| JP | 2015175458 A | 10/2015 |

OTHER PUBLICATIONS

PCT Written Opinion of the International Searching Authority, received in PCT/JP2021/008712, date of mailing Apr. 27, 2021, 10 pages.
Notice of Reasons of Refusal, received in the related Japanese Patent Application No. 2020-070254, mailed on Oct. 31, 2023, English machine translation, 10 pages.
Notice of Reasons of Refusal, received in the related Japanese Patent Application No. 2020-070254, mailed on Mar. 12, 2024, English machine translation, 10 pages.
Office Action received in the related German Patent Application No. 112021002236.9, dated Mar. 12, 2024, English machine translation, 16 pages.

* cited by examiner

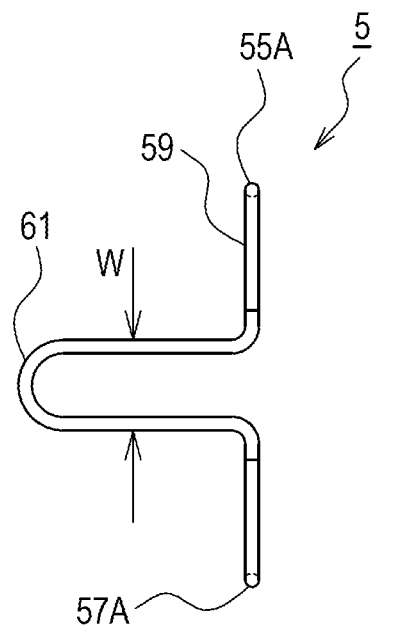
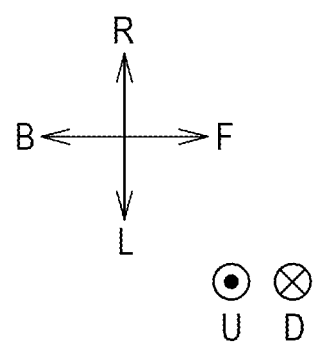
FIG. 9A

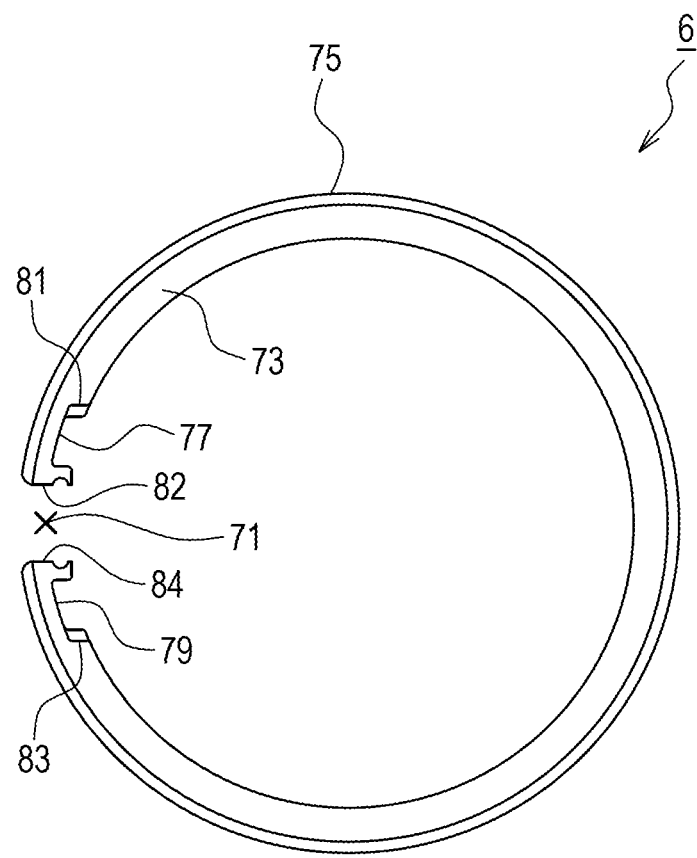
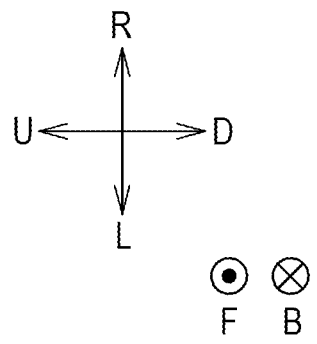
FIG. 15B

CONNECTOR

CROSS-REFERENCE TO RELATED APPLICATIONS

This patent application claims priority from PCT Patent Application No. PCT/JP2021/008712 filed Mar. 5, 2021, which claims priority from Japanese Patent Application No. JP 2020-070254 filed Apr. 9, 2020. Each of these patent applications are herein incorporated by reference in their entirety.

TECHNICAL FIELD

The present disclosure relates to a connector.

BACKGROUND ART

Patent Document 1 discloses a pipe joint. The pipe joint includes a male member, a female member, and a locking member. The locking member brings the male member and the female member into a locked state in a state where the male member is inserted into the female member. The locking member includes a pair of engaging shaft portions and a coupling shaft portion connecting them. The locking member is attached to the female member. When the male member is inserted into the female member, the locking member is pressed and deformed by a large-diameter portion of the male member.

PRIOR ART DOCUMENTS

Patent Documents

Patent Document 1: Japanese Unexamined Patent Application Publication No. H05-33891

SUMMARY OF THE INVENTION

Problems to be Solved by the Invention

A mode of deformation of the locking member is a mode in which each of the pair of engaging shaft portions rotates outward about an end portion on a coupling shaft portion side. Therefore, when the locking member is deformed, an end portion of the engaging shaft portion on a side opposite to the coupling shaft portion largely protrudes outward. As a result, it is necessary to provide a large gap around the pipe joint in order to allow deformation of the locking member.

In one aspect of the present disclosure, it is preferable to provide a connector capable of reducing a gap around a retainer.

Means for Solving the Problems

One aspect of the present disclosure is a connector including a connector body and a retainer, and configured to couple a first pipe having a bulge portion and a second pipe.

The connector body includes an insertion hole into which the first pipe is inserted, a first opening portion communicating with the insertion hole from an outer peripheral surface of the connector body, and a second opening portion communicating with the insertion hole from an outer peripheral surface of the connector body and opposing the first opening portion.

The retainer includes a first leg portion that is inserted into the first opening portion and configured to abut on a portion on a front side relative to the bulge portion in an outer peripheral surface of the coupled first pipe to regulate disengagement of the first pipe, a second leg portion that is inserted into the second opening portion and configured to abut on a portion on a front side relative to the bulge portion in an outer peripheral surface of the coupled first pipe to regulate disengagement of the first pipe, and an intermediate portion that connects a first connection portion in the first leg portion and a second connection portion in the second leg portion and is elastically deformable in an open manner so that a distance between the first connection portion and the second connection portion is widened.

An end surface of the first opening portion includes a first guide surface that guides the first leg portion in a direction where the distance is widened when a force in an insertion direction of the first pipe is applied to the first leg portion.

An end surface of the second opening portion includes a second guide surface that guides the second leg portion in a direction where the distance is widened when a force in the insertion direction is applied to the second leg portion.

When the first pipe is inserted into the insertion hole, the first leg portion to which the force in the insertion direction is applied by the bulge portion is guided by the first guide surface, and the second leg portion to which the force in the insertion direction is applied by the bulge portion is guided by the second guide surface, so that a distance between the first leg portion and the second leg portion becomes a distance that permits passage of the bulge portion.

When the first pipe is inserted into the insertion hole included in the connector that is one aspect of the present disclosure, the retainer is elastically deformed in an open manner such that a distance between the first connection portion and the second connection portion is widened. Therefore, in the connector that is one aspect of the present disclosure, the first leg portion can be suppressed from rotating outward about the first connection portion. In the connector that is one aspect of the present disclosure, the second leg portion can be suppressed from rotating outward about the second connection portion. Therefore, the connector that is one aspect of the present disclosure can suppress the retainer from largely protruding outward when the first pipe is inserted into the insertion hole. As a result, the connector that is one aspect of the present disclosure can reduce a gap around the retainer.

BRIEF DESCRIPTION OF THE DRAWINGS

FIG. 9A is an explanatory view illustrating a configuration of the retainer viewed from a viewpoint on the side of the upward direction U.

FIGS. 15A and 15B are explanatory views illustrating a configuration of the checker.

EXPLANATION OF REFERENCE NUMERALS

Figure 1:
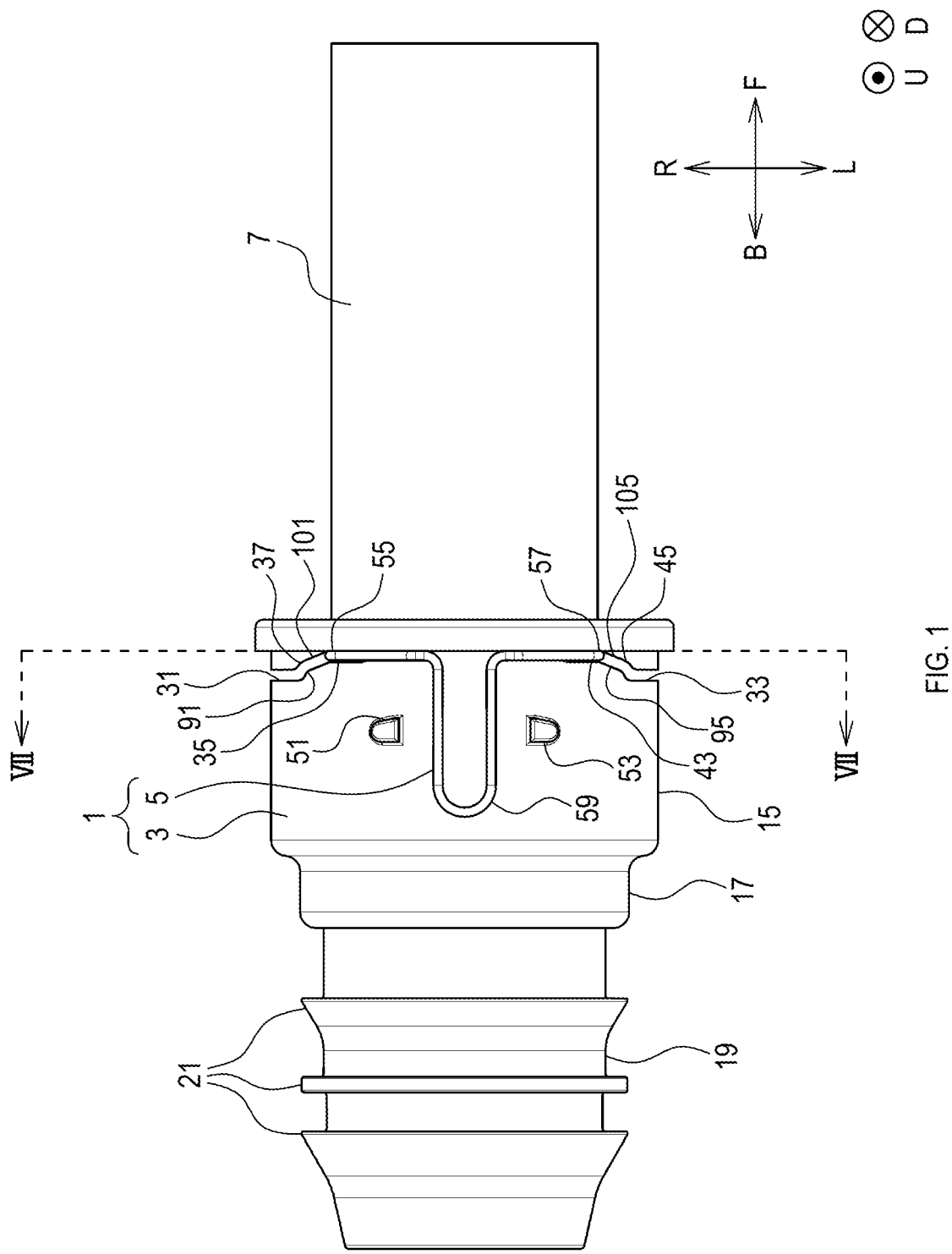
FIG. 1 is an explanatory view illustrating a configuration of the coupled connector and first pipe viewed from a viewpoint on a side of an upward direction U.

1 . . . connector, 3 . . . connector body, 5 . . . retainer, 6 . . . checker, 7 . . . first pipe, 9 . . . tip end, 11 . . . bulge portion, 13 . . . tip end portion, 15 . . . large-diameter portion, 17 . . . medium-diameter portion, 19 . . . small-diameter portion, 21 . . . projection, 23 . . . through hole, 25, 27 . . . step portion, 29 . . . insertion hole, 31 . . . first opening portion, 33 . . . second opening portion, 35, 39, 43, 47 . . . end portion, 37, 41, 45, 49 . . . oblique portion, 50 . . . O-ring, 51, 53 . . . projection portion, 52 . . . bush, 55 . . . first leg portion, 55A . . . first connection portion, 57 . . . second leg portion, 57A . . . second connection portion, 59 . . . intermediate portion, 61 . . . elastic deformation portion, 71 . . . ring split portion, 73 . . . body portion, 75 . . . cover portion, 77, 79 . . . groove, 81, 83 . . . side surface, 82, 84 . . . end surface, 91, 93 . . . first guide surface, 95, 97 . . . second guide surface, 101, 103 . . . first regulation surface, 105, 107 . . . second regulation surface

MODE FOR CARRYING OUT THE INVENTION

Illustrative embodiments of the present disclosure will be described with reference to the drawings.

1. Configuration of Connector 1

(1-1) Overall Configuration of Connector 1

As illustrated in FIGS. 1 to 8, a connector 1 includes a connector body 3 and a retainer 5. The connector 1 further includes a checker 6 illustrated in FIG. 15. The connector 1 is coupled to a first pipe 7 illustrated in FIG. 10. The connector 1 is coupled to a second pipe not illustrated. The second pipe is, for example, a resin tube.

Hereinafter, the leftward direction in FIG. 1 is the axial backward direction B, and the rightward direction in FIG. 1 is the axial forward direction F. The direction toward the viewer in FIG. 1 is the upward direction U, and the direction opposite to the direction toward the viewer in FIG. 1 is the downward direction D. The downward direction in. FIG. 1 is the leftward direction L, and the upward direction in FIG. 1 is the rightward direction R.

(1-2) Configuration of First Pipe 7

Figure 10:
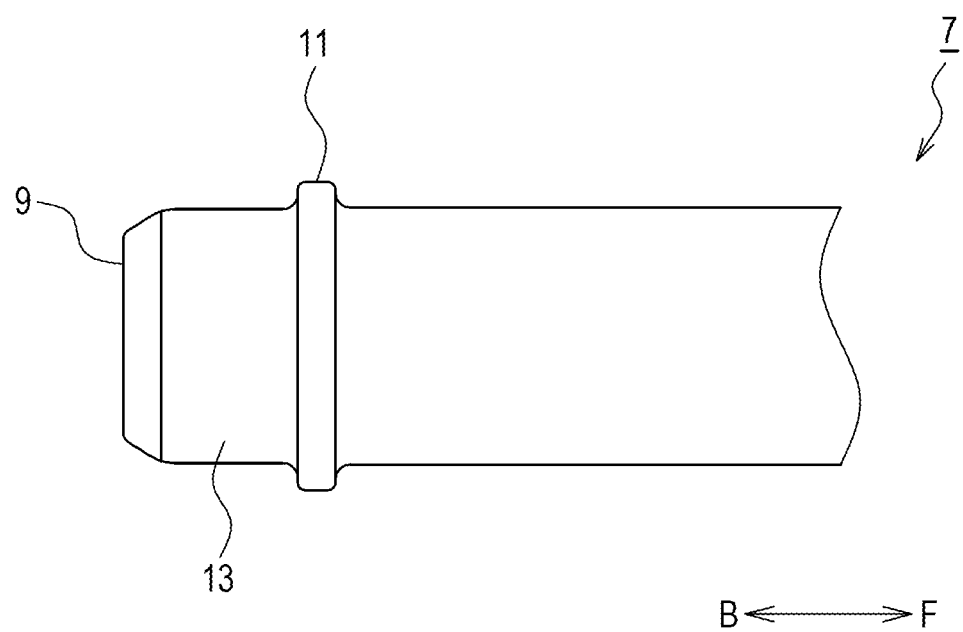
FIG. 10 is an explanatory view illustrating a configuration of the first pipe.

The configuration of the first pipe 7 will be described with reference to FIG. 10. The first pipe 7 has a hollow cylindrical basic form. The first pipe 7 is open at a tip end 9. The first pipe 7 is also open at an end portion on an opposite side to the tip end 9.

The first pipe 7 includes a bulge portion 11 at a position distanced in the axial forward direction F from the tip end 9. The description of the direction of the first pipe 7 indicates a direction when the first pipe 7 is coupled to the connector 1.

An outer diameter of the bulge portion 11 is d1. The outer diameter of the first pipe 7 is constant at a place other than the bulge portion 11. An outer diameter at a place other than the bulge portion 11 is d2. d1 is larger than d2. A portion of the first pipe 7 on the side of the tip end 9 relative to the bulge portion 11 is a tip end portion 13. An outer diameter of the tip end portion 13 is d2.

(1-3) Configuration of Connector Body 3

The configuration of the connector body 3 will be described with reference to FIGS. 1 to 8. The connector body 3 has a hollow cylindrical basic form. The connector body 3 includes a large-diameter portion 15, a medium-diameter portion 17, and a small-diameter portion 19. The large-diameter portion 15 is positioned in the connector body 3 on the side of the axial forward direction F. The large-diameter portion 15 has an outer diameter larger than those of the medium-diameter portion 17 and the small-diameter portion 19.

The small-diameter portion 19 is positioned in the connector body 3 on the side of the axial backward direction B. The small-diameter portion 19 has an outer diameter smaller than those of the large-diameter portion 15 and the medium-diameter portion 17. A plurality of annular projections 21 are formed on the outer peripheral surface of the small-diameter portion 19. When the small-diameter portion 19 is inserted inside the second pipe, the second pipe is coupled to the connector 1. Since the projection 21 bites into an inner peripheral surface of the second pipe, the second pipe hardly disengages from the small-diameter portion 19. The medium-diameter portion 17 is at a position interposed between the large-diameter portion 15 and the small-diameter portion 19.

As illustrated in FIGS. 5 to 8, the, connector body 3 includes a through hole 23 inside thereof. The through hole 23 extends parallel to the axial backward direction B and the axial forward direction F and penetrates the connector body 3.

Figure 8:
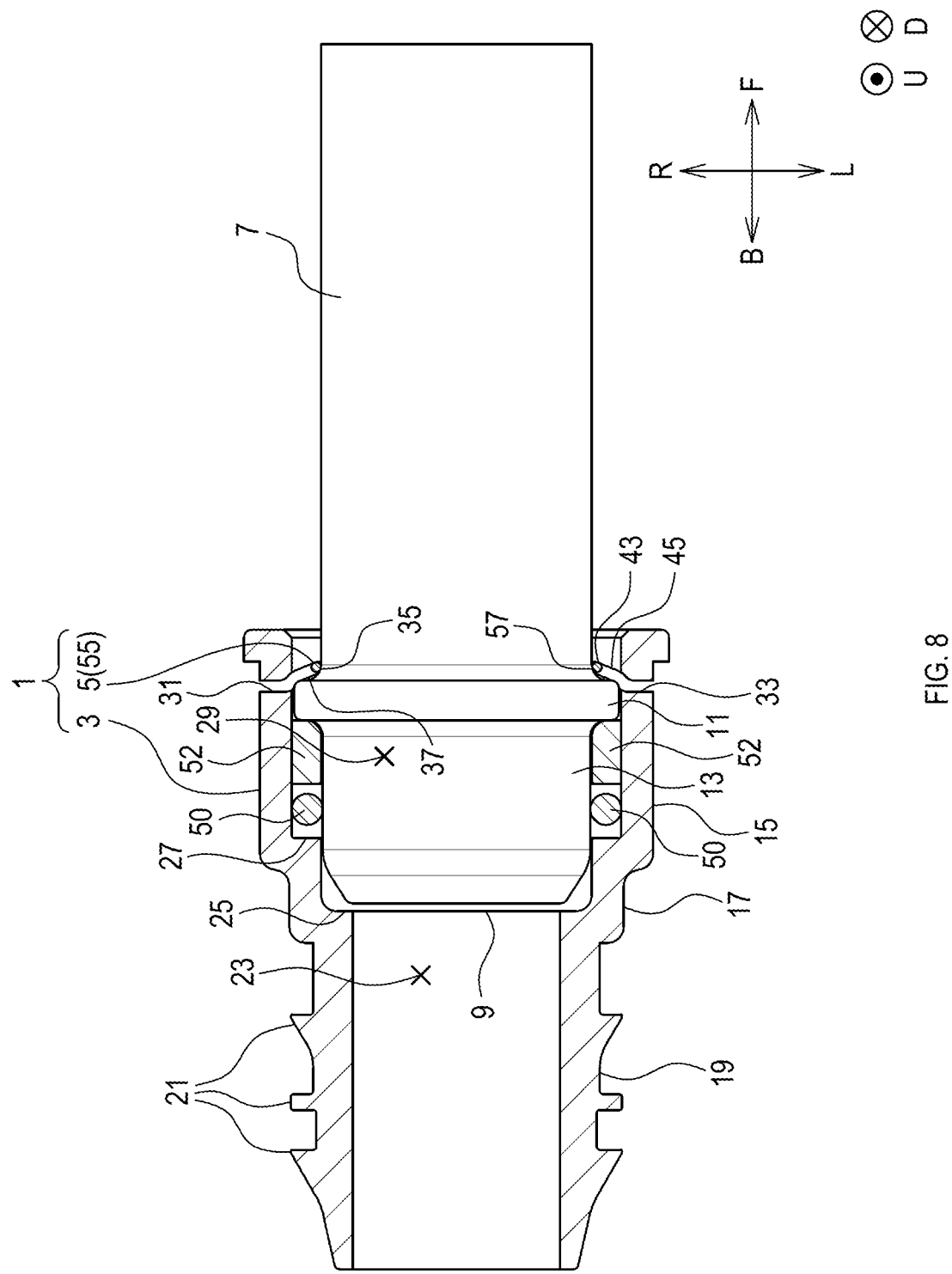
FIG. 8 is a cross-sectional view at a VIII-VIII cross section in FIG. 2.

As illustrated in FIG. 8, step portions 25 and 27 are formed on the inner peripheral surface of the connector body 3. The step portion 25 is formed in the medium-diameter portion 17. The step portion 27 is formed in the large-diameter portion 15 on the side of the axial backward direction B. The diameter of the through hole 23 is the largest on the side of the axial forward direction F relative to the step portion 27. A portion of the through hole 23 on the side of the axial forward direction F relative to the step portion 27 is an insertion hole 29. The diameter of the insertion hole 29 is slightly larger than d1.

The diameter of the through hole 23 is the smallest on the side of the axial backward direction B relative to the step portion 25 and is smaller than d2. The diameter of the through hole 23 is slightly larger than d2 and smaller than d1 in a portion between the step portion 25 and the step portion 27.

As illustrated in FIGS. 1 to 4 and 8, the connector body 3 includes a first opening portion 31 and a second opening portion 33. The first opening portion 31 is a groove formed on the large-diameter portion 15 on the side of the axial forward direction F and on the side of the rightward direction R. The width of the groove is slightly larger than the diameter of a first leg portion 55 described later. The first opening portion 31 communicates from the outer peripheral surface of the large-diameter portion 15 to the insertion hole 29.

Figure 4:
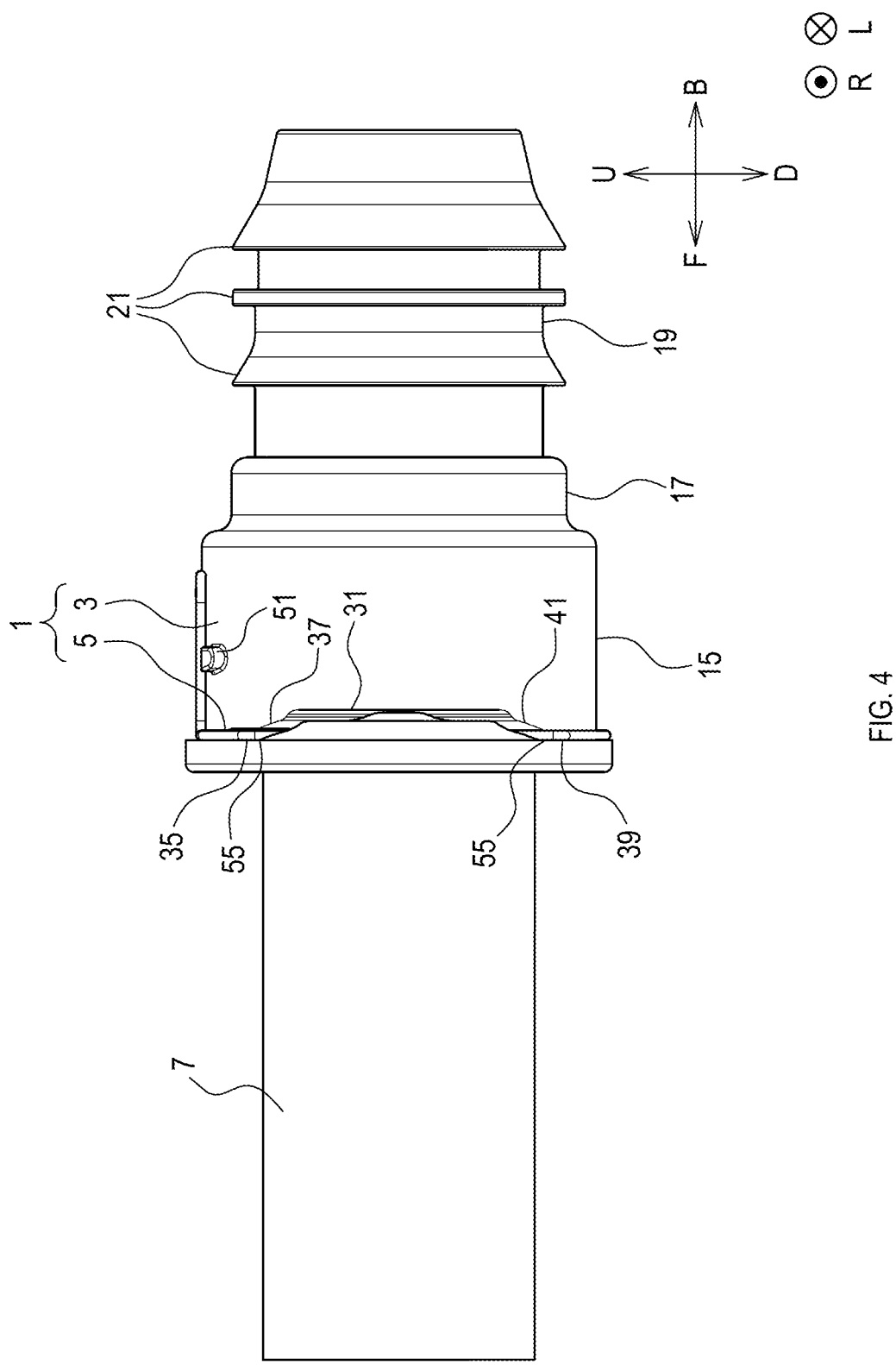
FIG. 4 is an explanatory view illustrating the configuration of the coupled connector and first pipe viewed from a viewpoint on a side of a rightward direction R.

The first opening portion 31 basically extends along the circumferential direction of the large-diameter portion 15. However, as illustrated in FIGS. 1 and 4, the first opening portion 31 includes an oblique portion 37 near an end portion 35 on the side of the upward direction U. The direction away from the end portion 35 along the oblique portion 37 is a direction having a component of the axial backward direction B, a component of the rightward direction R, and a component of the downward direction D.

Figure 3:
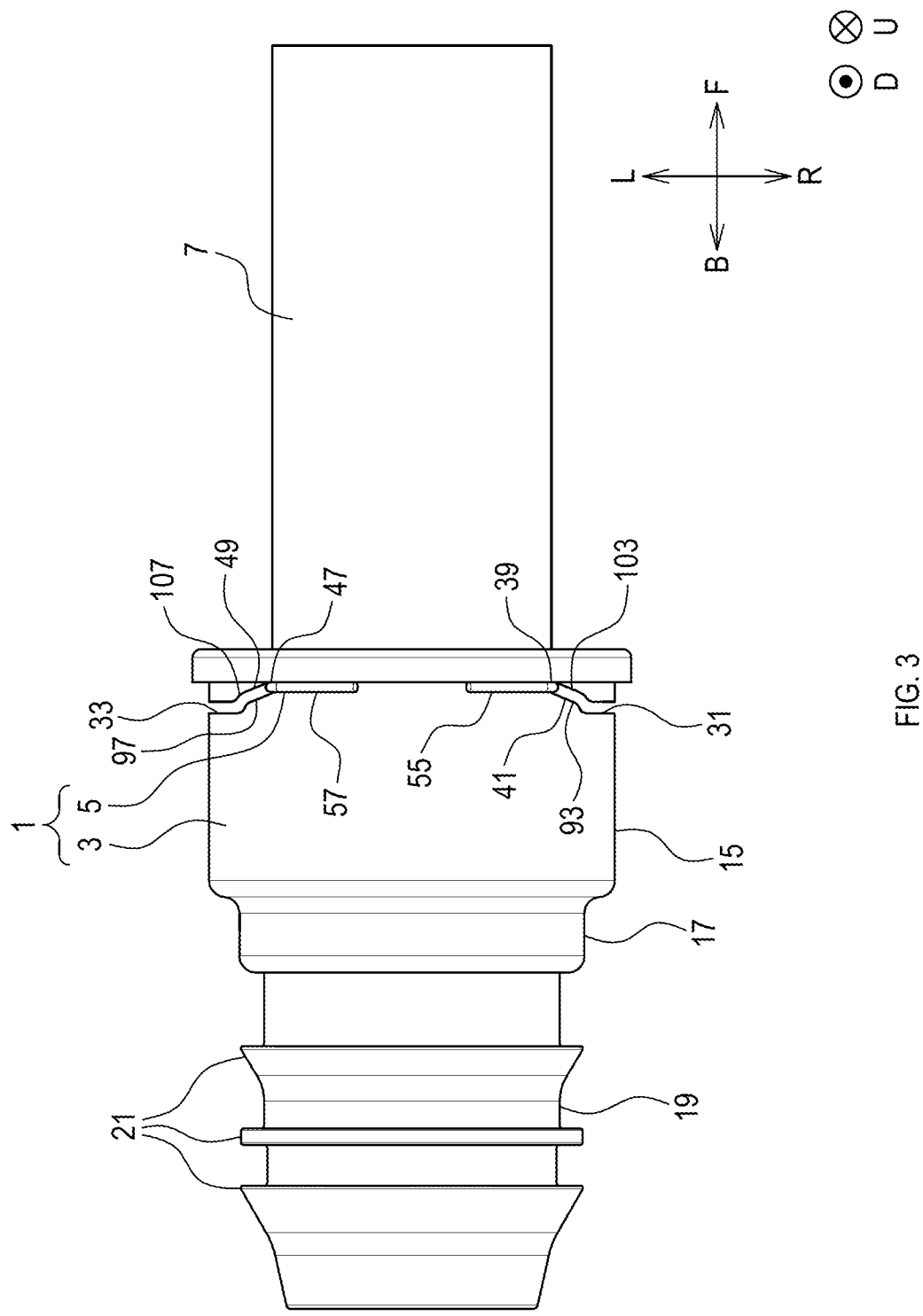
FIG. 3 is an explanatory view illustrating the configuration of the coupled connector and first pipe viewed from a viewpoint on a side of a downward direction D.

As illustrated in FIGS. 3 and 4, the first opening portion 31 includes an oblique portion 41 near an end portion 39 on the side of the downward direction D. The direction away from the end portion 39 along the oblique portion 41 is a direction having a component of the axial backward direction B, a component of the rightward direction R, and a component of the upward direction U.

The second opening portion 33 is a groove formed on the large-diameter portion 15 on the side of the axial forward direction F and on the side of the leftward direction L. The width of the groove is slightly larger than the diameter of a second leg portion 57 described later. The second opening portion 33 communicates from the outer peripheral surface of the large-diameter portion 15 to the insertion hole 29. The second opening portion 33 opposes the first opening portion 31 across the center of the insertion hole 29.

Figure 2:
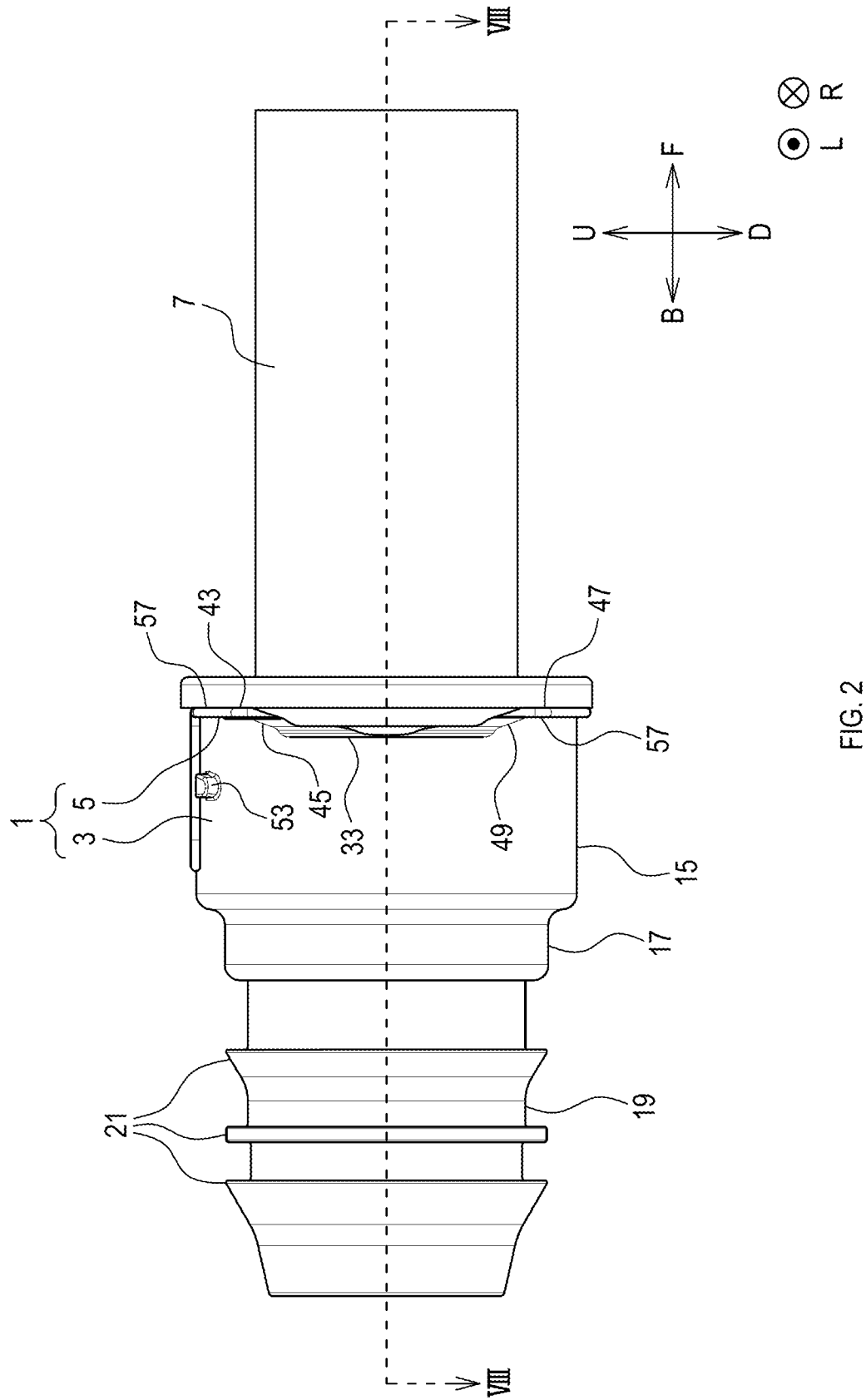
FIG. 2 is an explanatory view illustrating the configuration of the coupled connector and first pipe viewed from a viewpoint on a side of a leftward direction L.

The second opening portion 33 basically extends along the circumferential direction of the large-diameter portion 15. However, as illustrated in FIGS. 1 and 2, the second opening portion 33 includes an oblique portion 45 near an end portion 43 on the side of the upward direction U. The direction away from the end portion 43 along the oblique portion 45 is a direction having a component of the axial backward direction B, a component of the leftward direction L, and a component of the downward direction D.

As illustrated in FIGS. 2 and 3, the second opening portion 33 includes an oblique portion 49 near an end portion 47 on the side of the downward direction D. The direction away from the end portion 47 along the oblique portion 49 is a direction having a component of the axial backward direction B, a component of the leftward direction L, and a component of the upward direction U.

As illustrated in FIGS. 1, 2, and 4, the connector body 3 includes projection portions 51 and 53. The projection portions 51 and 53 are formed on a portion of the outer peripheral surface of the large-diameter portion 15 on the side of the upward direction U. The projection portions 51 and 53 protrude radially outward of the large-diameter portion 15 from the periphery thereof. The projection portions 51 and 53 are arranged at distances along the circumferential direction of the large-diameter portion 15.

As illustrated in FIG. 8, an O-ring 50 and a bush 52 are internally inserted into the insertion hole 29. The O-ring 50 is positioned on the insertion hole 29 on the side of the axial backward direction B. The bush 52 is positioned on the side of the axial forward direction F relative to the O-ring 50.

The first pipe 7 is inserted into the insertion hole 29 with the tip end 9 as a head, and is coupled to the connector 1. As illustrated in FIG. 8, when the first pipe 7 is coupled to the connector 1, the tip end 9 reaches near the step portion 25. The bulge portion 11 abuts on the side surface of the bush 52 from the side of the axial forward direction F. The tip end portion 13 is internally inserted into the O-ring 50 and the bush 52. The bulge portion 11 is positioned slightly on the side of the axial backward direction B relative to the first opening portion 31 and the second opening portion 33.

(1-4) Configuration of Retainer 5

Figure 9B:
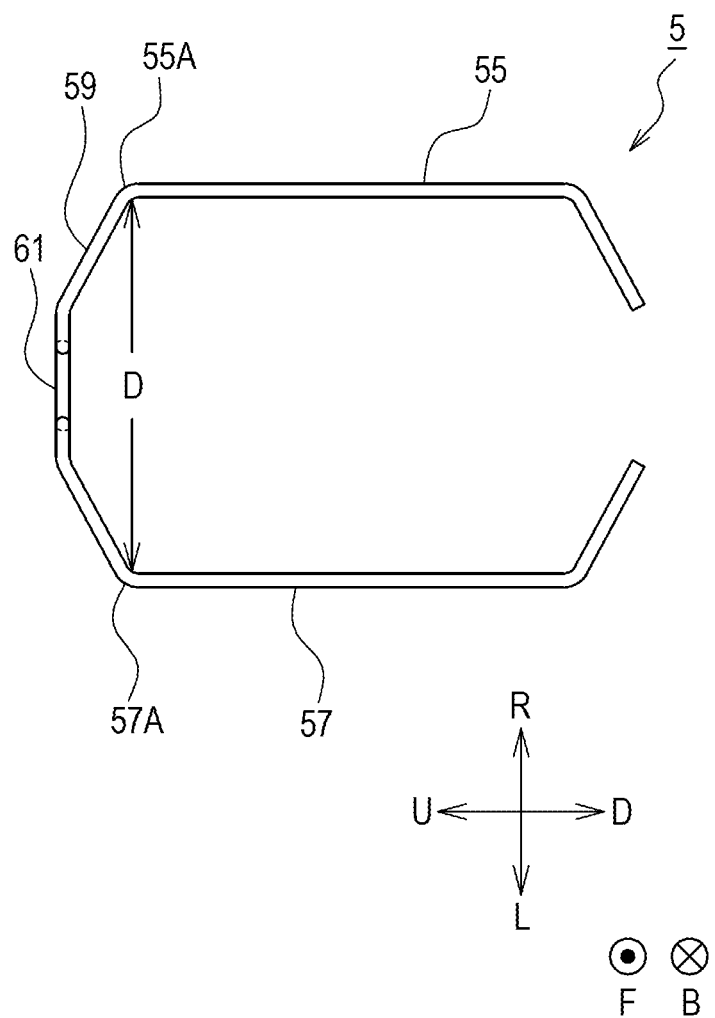
FIG. 9B is an explanatory view illustrating a configuration of the retainer viewed from a viewpoint on the side of the axial forward direction F.

The configuration of the retainer 5 will be described with reference to FIG. 9. The retainer 5 is comprised of, for example, a wire material such as metal. The retainer 5 is made of an elastically deformable material. The retainer 5 includes the first leg portion 55, the second leg portion 57, and an intermediate portion 59.

Each of the first leg portion 55 and the second leg portion 57 extends in the downward direction D and has a shape bent inward near the lower end.

The intermediate portion 59 is a portion that connects a first connection portion 55A of the first leg portion 55 and a second connection portion 57A of the second leg portion 57. The first connection portion 55A is an upper end of the first leg portion 55. The second connection portion 57A is an upper end of the second leg portion 57.

The intermediate portion 59 includes an elastic deformation portion 61 bent in a U shape. The elastic deformation portion 61 can be elastically deformed such that a width W thereof changes. More specifically, the elastic deformation portion 61 can be elastically deformed (hereinafter referred to as elastic deformation in an open manner) such that an opening in the U shape widens, for example. When the elastic deformation in the open manner occurs, a distance D between the first connection portion 55A and the second connection portion 57A in the rightward direction R and the leftward direction L is enlarged. When the elastic deformation in the open manner occurs, the width W becomes larger than that before the elastic deformation in the open manner occurs. When the elastic deformation in the open manner occurs, the width W becomes relatively narrower in the elastic deformation portion 61 as the measurement position of the width W goes in the axial backward direction B.

A state where the retainer 5 is attached to the connector body 3 and the first pipe 7 is coupled to the connector 1 is as illustrated in FIGS. 1 to 8. The state of the retainer 5 at this time is assumed to be a basic state hereinafter. In addition to the basic state, the state of the retainer 5 includes an expanded state described later.

Figure 5:
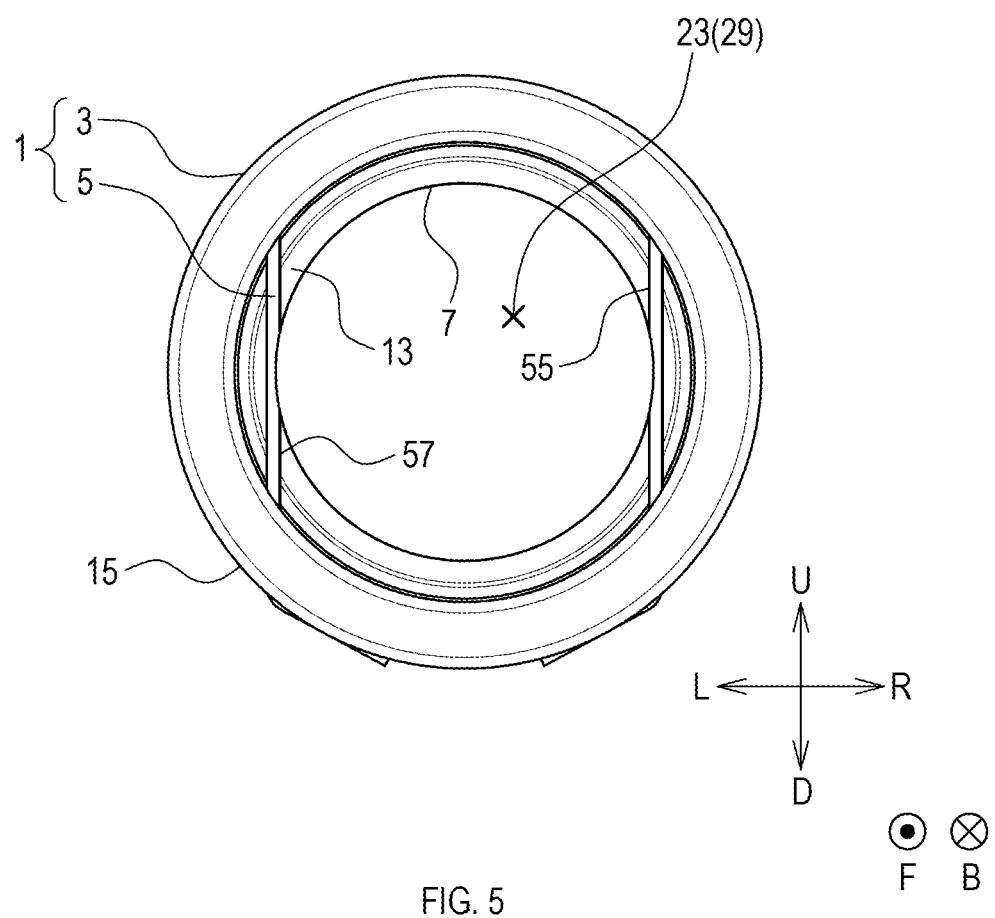
FIG. 5 is an explanatory view illustrating the configuration of the coupled connector and first pipe viewed from a viewpoint on a side of an axial forward direction F.

The first leg portion 55 is inserted into the first opening portion 31. As illustrated in FIGS. 1, 3, and 4, the first leg portion 55 deeply enters the first opening portion 31 to come into contact with the end portion 35 and the end portion 39. As illustrated in FIGS. 5 and 8, the first leg portion 55 has advanced in the center direction of the insertion hole 29. The first leg portion 55 is at a position overlapping the bulge portion 11 when viewed from the side of the axial forward direction F. The first leg portion 55 is present on the side of the axial forward direction F relative to the bulge portion 11. The first leg portion 55 abuts against a portion of the outer peripheral surface of the first pipe 7 on the side of the axial forward direction F relative to the bulge portion 11. The side of the axial forward direction F relative to the bulge portion 11 corresponds to the front side relative to the bulge portion 11. The first leg portion 55 regulates disengagement of the first pipe 7 coupled to the connector 1.

The second leg portion 57 is inserted into the second opening portion 33. As illustrated in FIGS. 1, 2, and 3, the second leg portion 57 deeply enters the second opening portion 33 to come into contact with the end portion 43 and the end portion 47. As illustrated in FIGS. 5 and 8, the second leg portion 57 has advanced in the center direction of the insertion hole 29. The second leg portion 57 is at a position overlapping the bulge portion 11 when viewed from the side of the axial forward direction F. The second leg portion 57 is present on the side of the axial forward direction F relative to the bulge portion 11. The second leg portion 57 abuts against a portion of the outer peripheral surface of the first pipe 7 on the side of the axial forward direction F relative to the bulge portion 11. The second leg portion 57 regulates disengagement of the first pipe 7 coupled to the connector 1.

Figure 6:
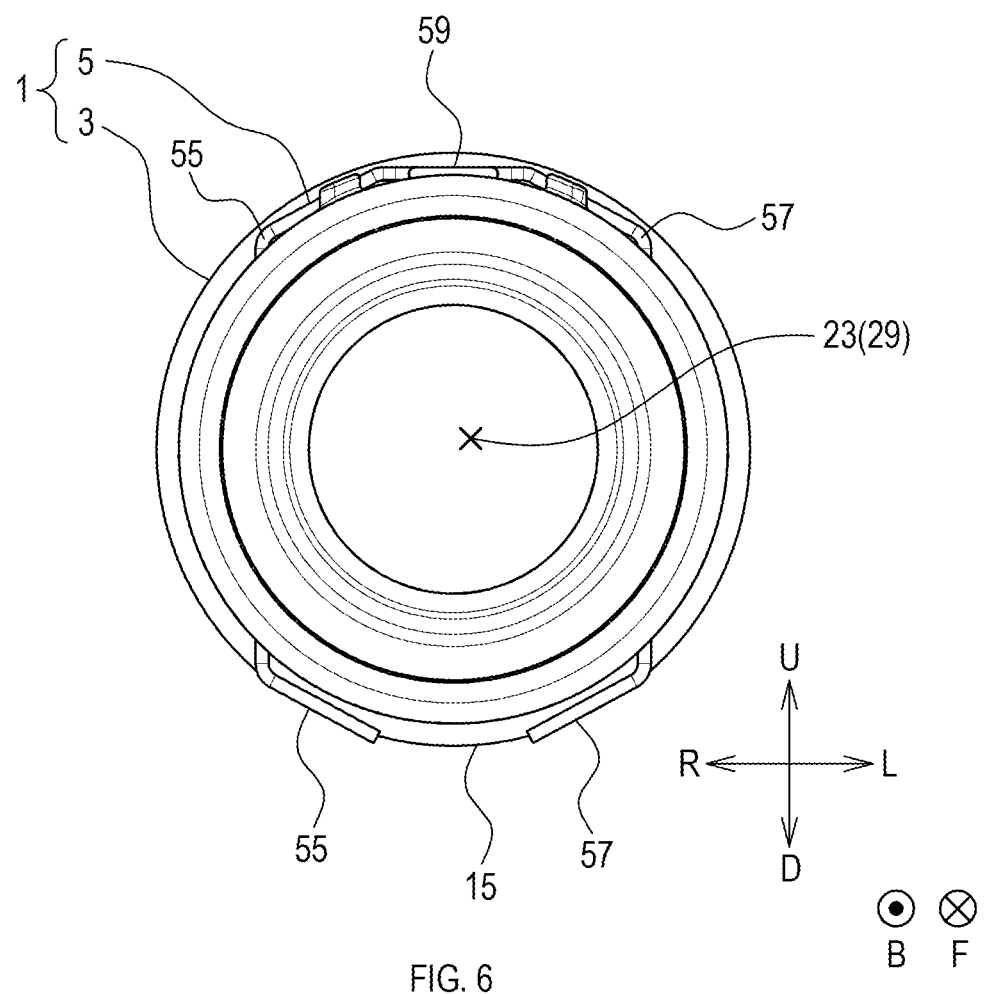
FIG. 6 is an explanatory view illustrating the configuration of the coupled connector and first pipe viewed from a viewpoint on a side of an axial backward direction B.
Figure 7:
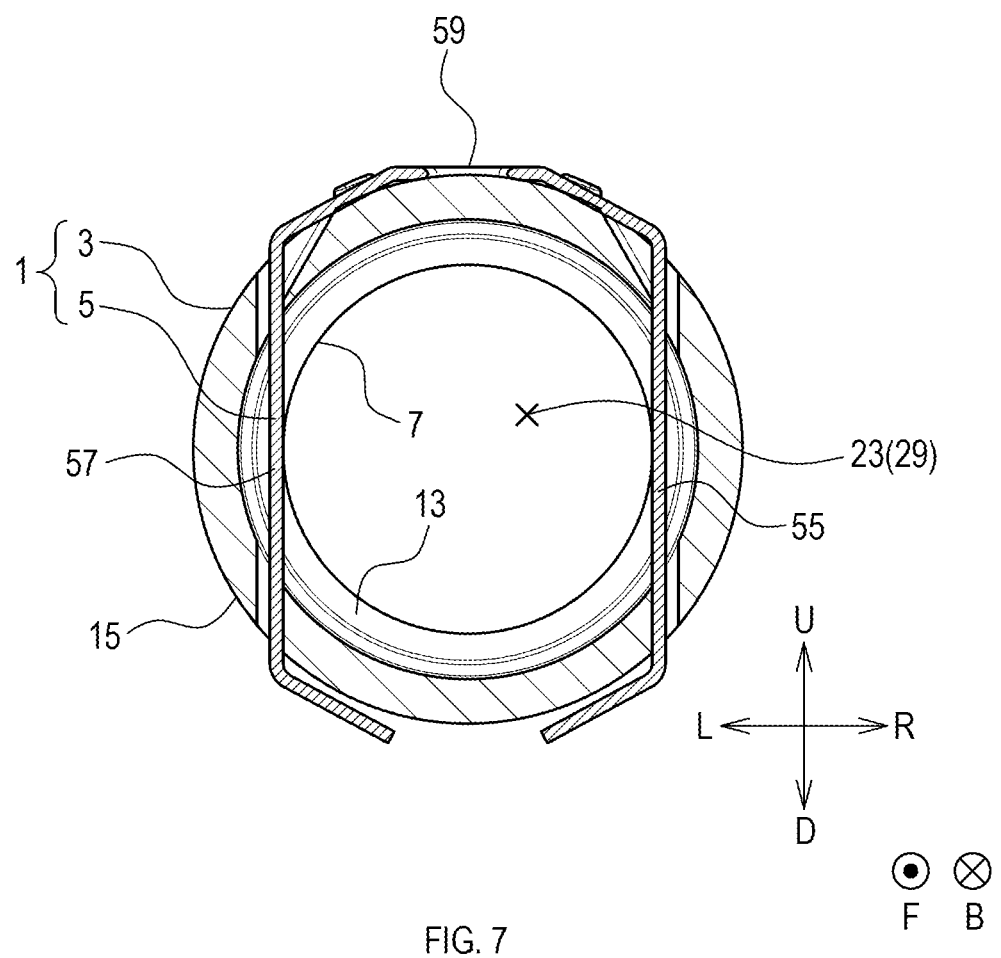
FIG. 7 is a cross-sectional view at a VII-VII cross section in FIG. 1.

As illustrated in FIGS. 1, 6, and 7, the intermediate portion 59 is in contact with a portion of the outer peripheral surface of the large-diameter portion 15 on the side of the upward direction U. The elastic deformation portion 61 is positioned between the projection portions 51 and 53. The orientation of the elastic deformation portion 61 is an orientation where the apex of the U shape is on the side of the axial backward direction B. When the retainer 5 is in the basic state, the width W and the distance D are smaller than those when the retainer 5 is in the expanded state.

(1-5) Configuration of Checker 6

Figure 15A:
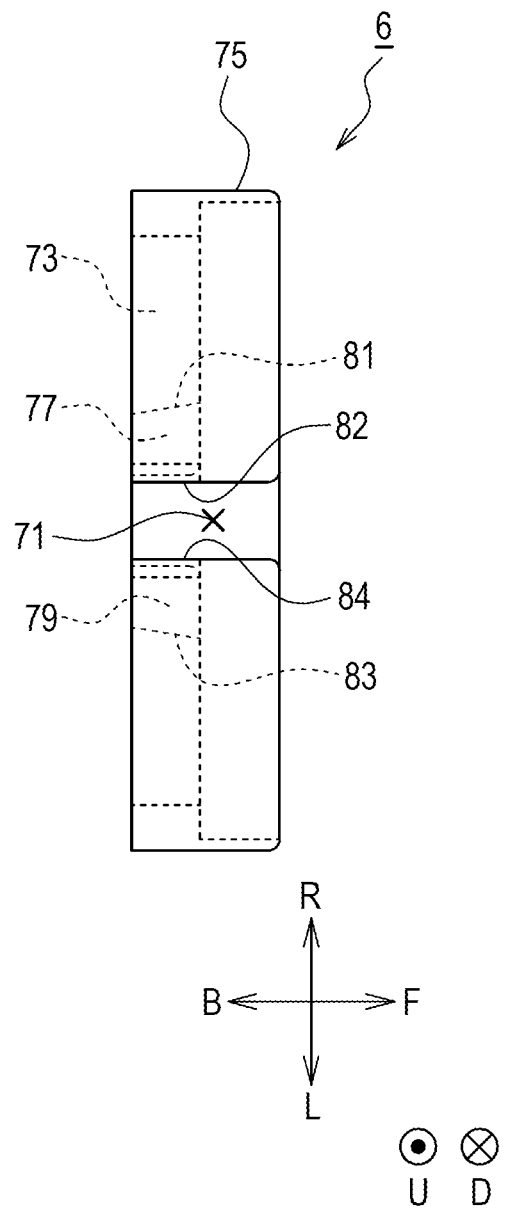

The configuration of the checker 6 will be described with reference to FIG. 15. The checker 6 has an annular basic form. More specifically, the checker 6 has a C shape form having a ring split portion 71 when viewed in an axial direction of the ring. The checker 6 is externally inserted to the large-diameter portion 15. The large-diameter portion 15 is inserted into the checker 6. The checker 6 can be elastically deformed to enlarge the ring split portion 71.

The checker 6 includes a body portion 73 and a cover portion 75. The body portion 73 is a portion that abuts on the outer peripheral surface of the large-diameter portion 15. The cover portion 75 is a portion extending in the axial forward direction F from the outer peripheral side of the body portion 73. There is a gap between the outer peripheral surface of the large-diameter portion 15 and the cover portion 75.

Grooves 77 and 79 are formed on the inner peripheral surface of the body portion 73. The grooves 77 and 79 are formed in the body portion 73 from an end portion on the side of the axial backward direction B to an end portion on the side of the axial forward direction F. The grooves 77 and 79 are disposed so as to sandwich the ring split portion 71.

Of the side surfaces of the groove 77, a side surface 81 farther from the ring split portion 71 is inclined such that a point on the side surface 81 approaches an end surface 82 as the point is directed in the axial backward direction B. The end surface 82 is an end surface of the body portion 73 facing the ring split portion 71. Of the side surfaces of the groove 79, a side surface 83 farther from the ring split portion 71 is inclined such that a point on the side surface 83 approaches an end surface 84 as the point is directed in the axial backward direction B. The end surface 84 is an end surface of the body portion 73 facing the ring split portion 71.

2. Operation of Retainer 5

The operation of the retainer 5 when the first pipe 7 is coupled to the connector 1 will be described with reference to FIGS. 11 to 14. In FIGS. 11 to 13, description of the checker 6 will be omitted for convenience of description.

Figure 11A:
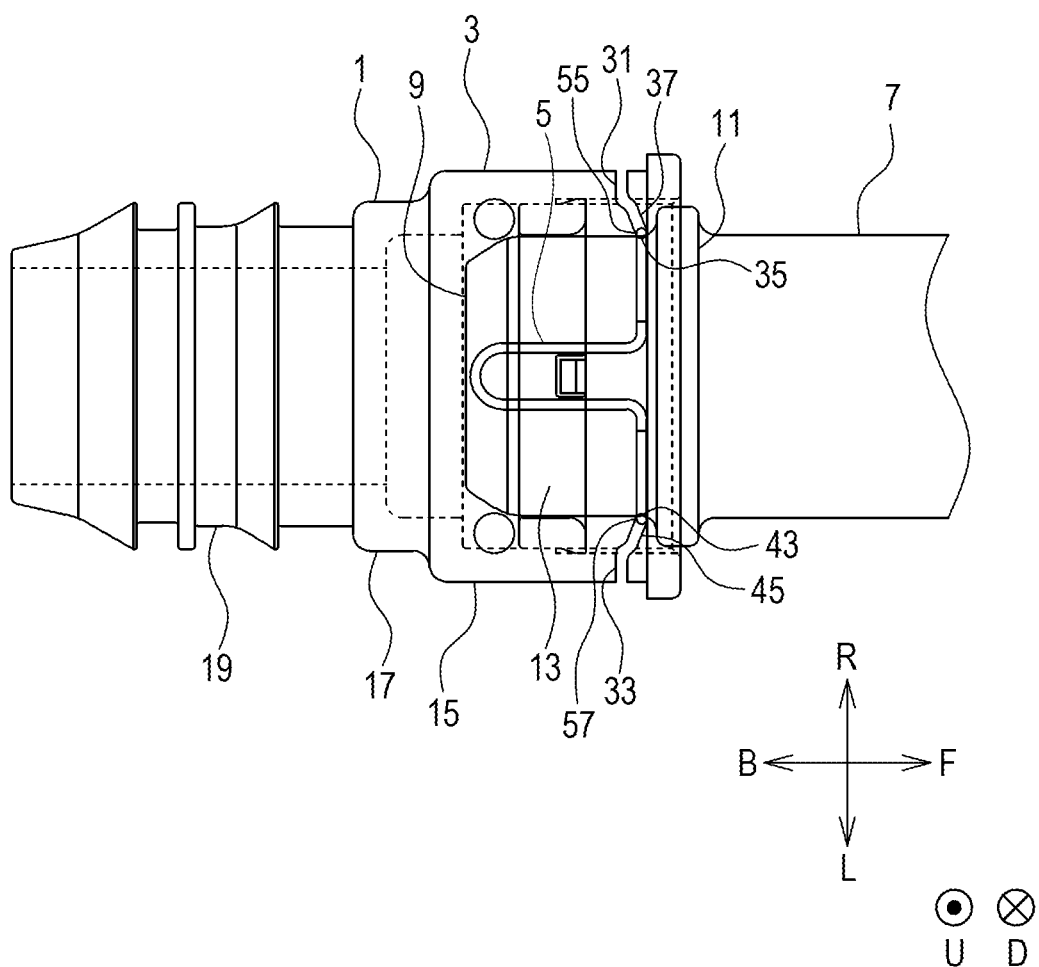
FIGS. 11A and 11B are explanatory views illustrating the connector and the first pipe when the first pipe is inserted into the insertion hole and the bulge portion is not yet in contact with the first leg portion and the second leg portion.
Figure 11B:
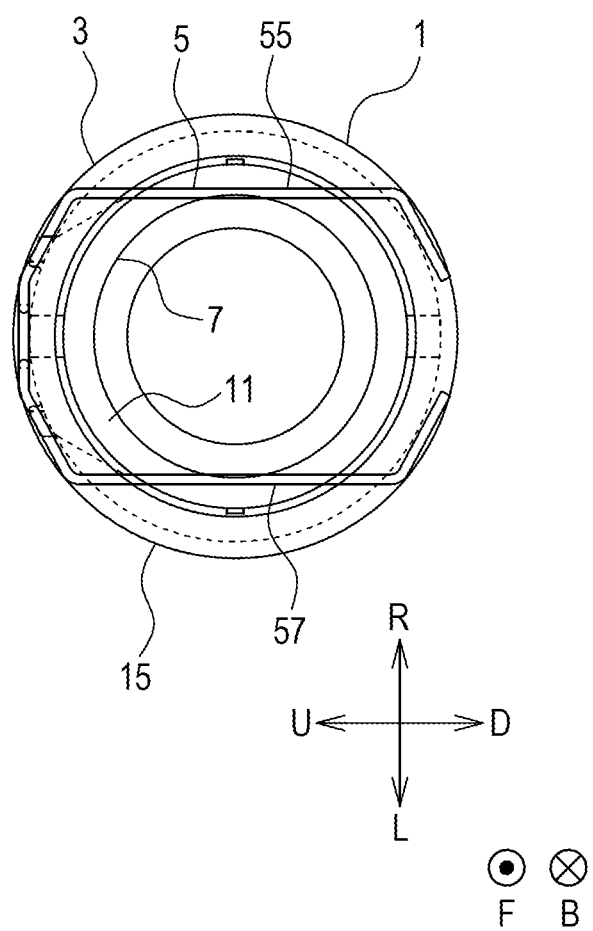
Figure 14A:
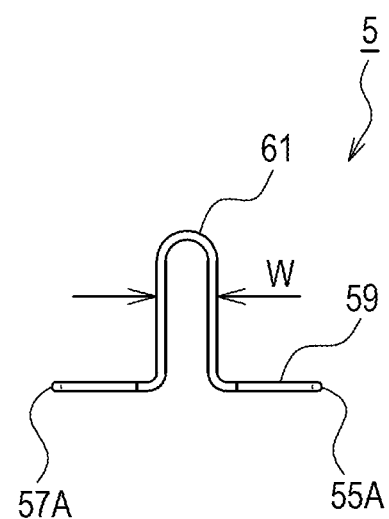
FIGS. 14A and 14B are explanatory views illustrating the retainer when no force is applied from the bulge portion.
Figure 14B:
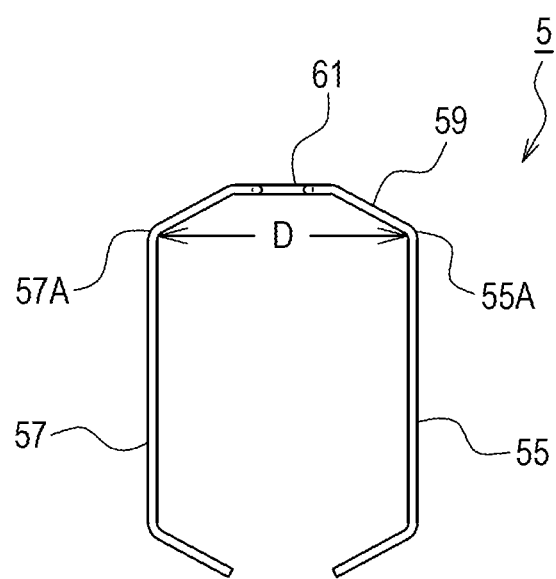

The state illustrated in FIGS. 11A and 11B is a state where the first pipe 7 is inserted into the insertion hole 29, and the bulge portion 11 is not yet in contact with the first leg portion 55 and the second leg portion 57. At this time, the state of the retainer 5 is the basic state. In the state illustrated in FIGS. 11A and 11B, as illustrated in FIG. 14A, no elastic deformation in the open manner occurs in the elastic deformation portion 61, and the width W is small. As illustrated in FIG. 14B, the distance D is small.

When the first pipe 7 is inserted deeper from the state illustrated in FIGS. 11A and 11B, the bulge portion 11 applies a force in the axial backward direction B to the first leg portion 55 and the second leg portion 57. The axial backward direction B corresponds to the insertion direction.

The first leg portion 55 is pressed against a first guide surface 91 illustrated in FIG. 1. The first guide surface 91 is an end surface of the large-diameter portion 15 facing the oblique portion 37 and is an end surface on the side of the axial backward direction B. The first leg portion 55 is pressed against a first guide surface 93 illustrated in FIG. 3. The first guide surface 93 is an end surface of the large-diameter portion 15 facing the oblique portion 41 and is an end surface on the side of the axial backward direction B. The first guide surfaces 91 and 93 are inclined such that points on the first guide surfaces 91 and 93 are directed in the rightward direction R as the points are directed in the axial backward direction B. Therefore, as illustrated in FIG. 12A, the first leg portion 55 is guided by the first guide surfaces 91 and 93 and moves in the rightward direction R.

The second leg portion 57 is pressed against a second guide surface 95 illustrated in FIG. 1. The second guide surface 95 is an end surface of the large-diameter portion 15 facing the oblique portion 45 and is an end surface on the side of the axial backward direction B. The second leg portion 57 is pressed against a second guide surface 97 illustrated in FIG. 3. The second guide surface 97 is an end surface of the large-diameter portion 15 facing the oblique portion 49 and is an end surface on the side of the axial backward direction B. The second guide surfaces 95 and 97 are inclined such that the points on the second guide surfaces 95 and 97 are directed in the leftward direction L as the points are directed in the axial backward direction B. Therefore, as illustrated in FIG. 12A, the second leg portion 57 is guided by the second guide surfaces 95 and 97 and moves in the leftward direction L.

Figure 12A:
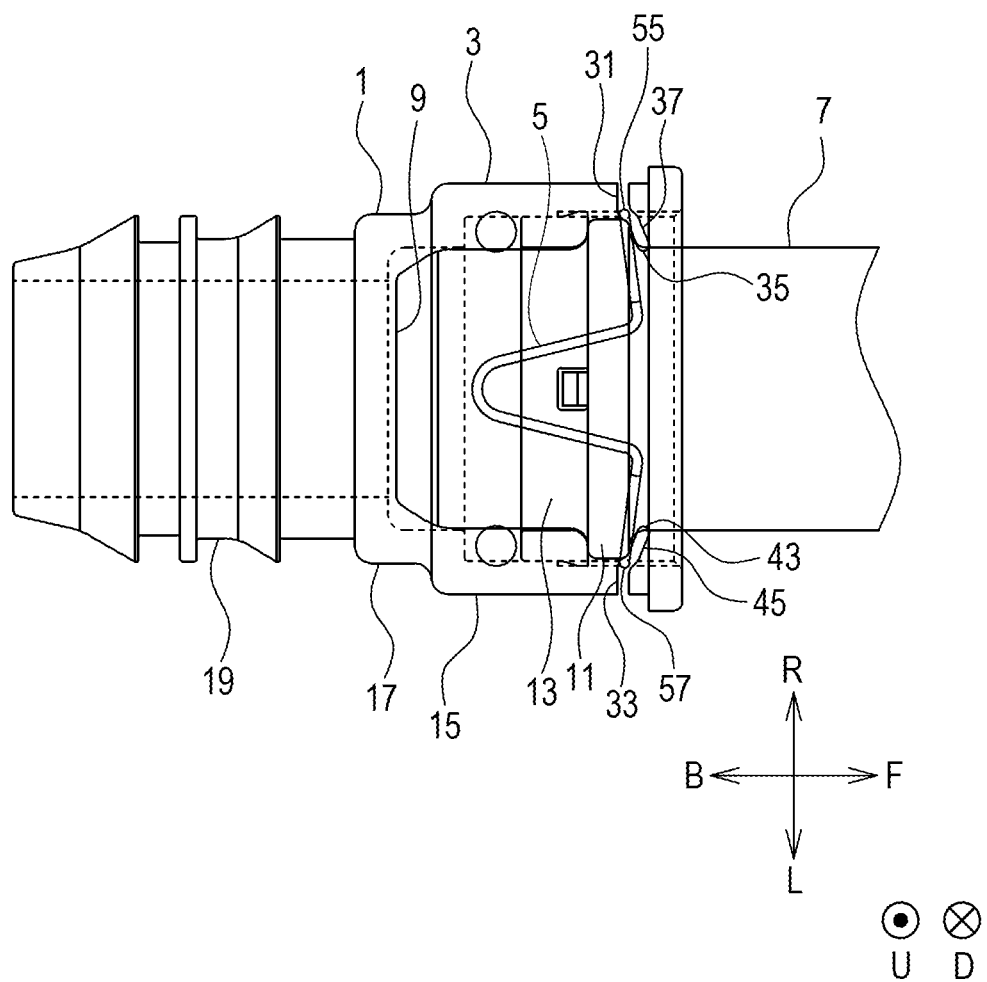
FIGS. 12A and 12B are explanatory views illustrating the connector and the first pipe when the bulge portion applies a force to the retainer to increase the distance.
Figure 12B:
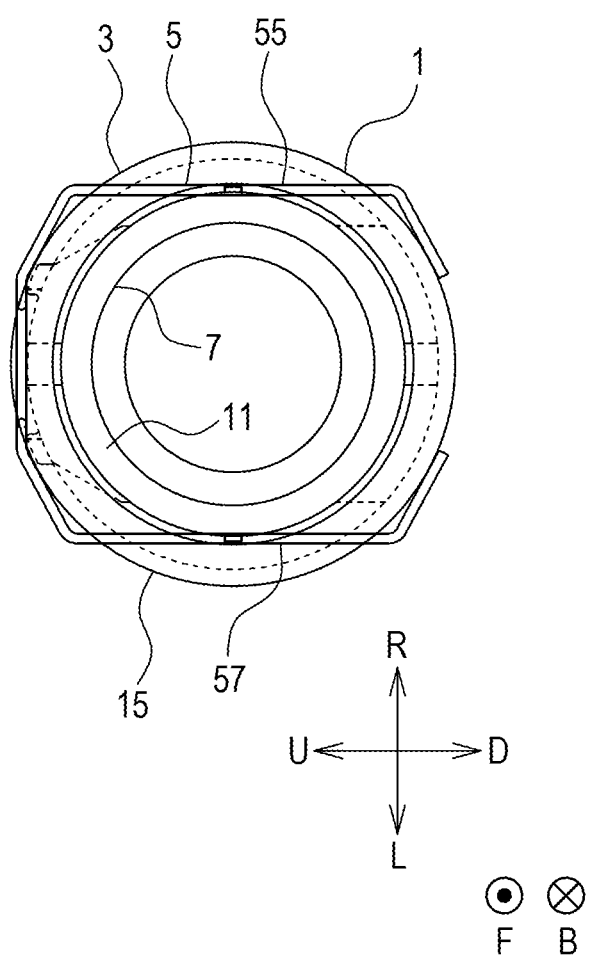
Figure 14C:
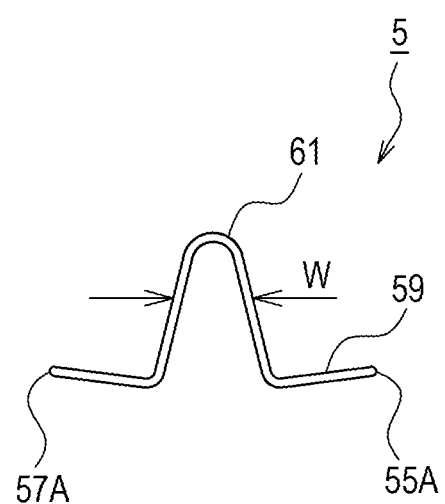
FIGS. 14C and 14D are explanatory views illustrating the retainer when the distance is increased by receiving the force from the bulge portion.
Figure 14D:
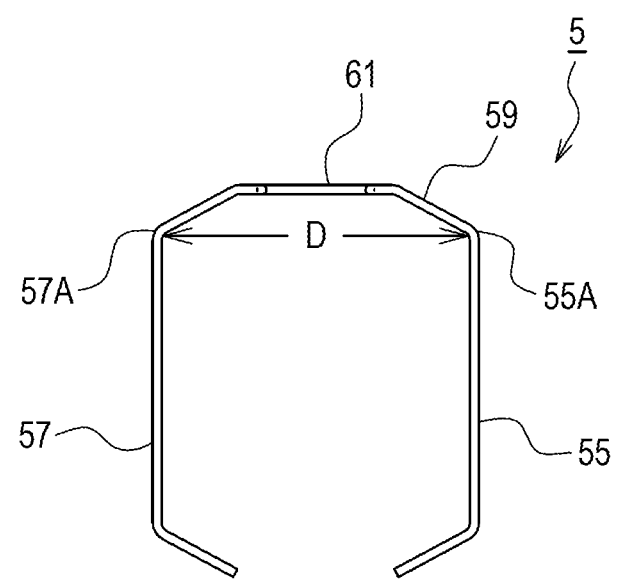

When the first leg portion 55 moves in the rightward direction R and the second leg portion 57 moves in the leftward direction L, as illustrated in FIGS. 12A and 14C, elastic deformation in the open manner occurs in the elastic deformation portion 61, and the width W increases. As a result, as illustrated in FIGS. 12B and 14D, the distance D is widened.

Since the distance D is widened, the distance between the first leg portion 55 and the second leg portion 57 becomes a distance that permits passage of the bulge portion 11. The state of the retainer 5 at this time is the expanded state. The bulge portion 11 passes through between the first leg portion 55 and the second leg portion 57 and advances in the axial backward direction B relative to the first leg portion 55 and the second leg portion 57.

When the bulge portion 11 advances in the axial backward direction B relative to the first leg portion 55 and the second leg portion 57, the bulge portion 11 no longer applies a force to the first leg portion 55 and the second leg portion 57, and therefore, the first leg portion 55 and the second leg portion 57 return to the state illustrated in FIGS. 14A and 14B by a restoring force generated by elastic deformation. That is, the state of the retainer 5 returns to the basic state. The states of the connector 1 and the first pipe 7 at this time are illustrated in FIGS. 13A and 13B.

Figure 13A:
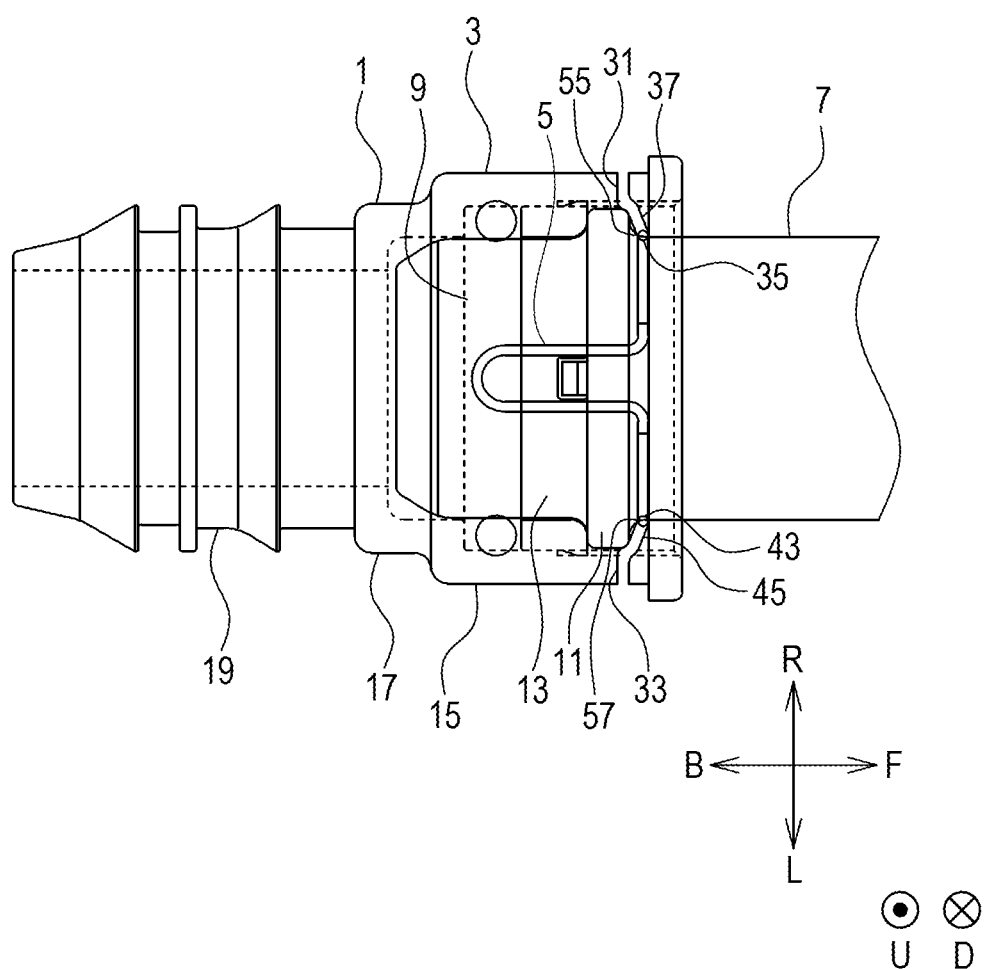
FIGS. 13A and 13B are explanatory views illustrating the coupled connector and first pipe.
Figure 13B:
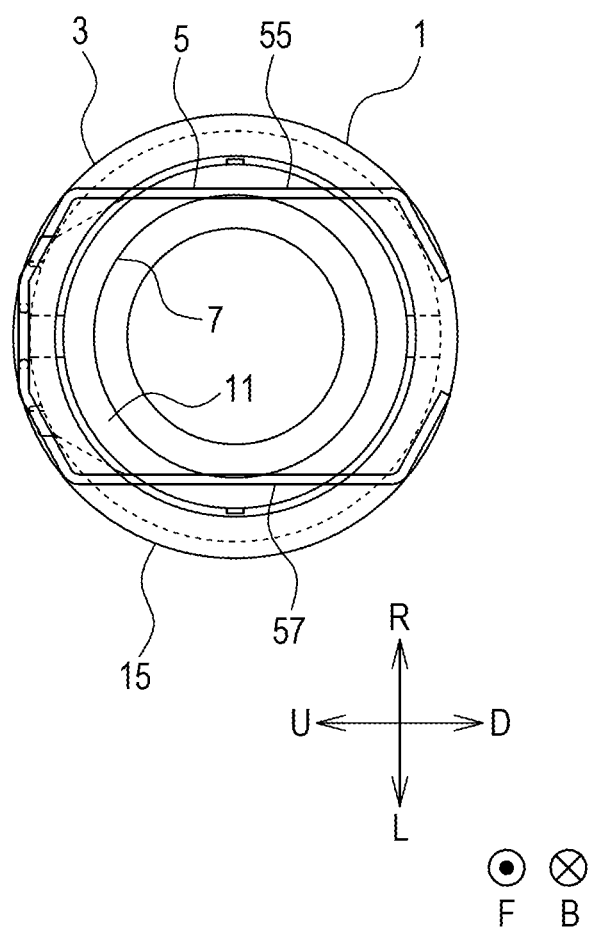

As illustrated in FIG. 13A, the first leg portion 55 and the second leg portion 57 are on the side of the axial forward direction F relative to the bulge portion 11. As illustrated in FIG. 13B, the first leg portion 55 and the second leg portion 57 are at positions overlapping the bulge portion 11 when viewed from the side of the axial forward direction F. Therefore, the first leg portion 55 and the second leg portion 57 regulate disengagement of the first pipe 7. As a result of the above process, the first pipe 7 is coupled to the connector 1.

When a force in the axial forward direction F is applied to the coupled first pipe 7, the bulge portion 11 presses the first leg portion 55 against a first regulation surface 101 illustrated in FIG. 1 and a first regulation surface 103 illustrated in FIG. 3. The axial forward direction F corresponds to a disengagement direction. The first regulation surface 101 is an end surface of the large-diameter portion 15 facing the oblique portion 37 and is an end surface on the side of the axial forward direction F. The first regulation surface 103 is an end surface of the large-diameter portion 15 facing the oblique portion 41 and is an end surface on the side of the axial forward direction F.

The first regulation surfaces 101 and 103 are inclined such that points on the first regulation surfaces 101 and 103 are directed in the rightward direction R as the points are directed in the axial backward direction B. Therefore, even if a force in the axial forward direction F is applied to the first leg portion 55 and the first leg portion 55 is pressed against the first regulation surfaces 101 and 103, the first leg portion 55 is not guided in the rightward direction R. That is, even if a force in the axial forward direction F is applied to the first pipe 7, the first leg portion 55 is not guided in a direction where the distance D is widened.

When a force in the axial forward direction F is applied to the coupled first pipe 7, the bulge portion 11 presses the second leg portion 57 against a second regulation surface 105 illustrated in FIG. 1 and a second regulation surface 107 illustrated in FIG. 3. The second regulation surface 105 is an end surface of the large-diameter portion 15 facing the oblique portion 45 and is an end surface on the side of the axial forward direction F. The second regulation surface 107 is an end surface of the large-diameter portion 15 facing the oblique portion 49 and is an end surface on the side of the axial forward direction F.

The second regulation surfaces 105 and 107 are inclined such that points on the second regulation surfaces 105 and 107 are directed in the leftward direction L as the points are directed in the axial backward direction B. Therefore, even if a force in the axial forward direction F is applied to the second leg portion 57 and the second leg portion 57 is pressed against the second regulation surfaces 105 and 107, the second leg portion 57 is not guided in the leftward direction L. That is, even if a force in the axial forward direction F is applied to the first pipe 7, the second leg portion 57 is not guided in a direction where the distance D is widened.

Therefore, even if a force in the axial forward direction F is applied to the coupled first pipe 7, the distance D is not widened, and the bulge portion 11 cannot pass through between the first leg portion 55 and the second leg portion 57, so that the first pipe 7 does not disengage from the connector 1.

3. Operation of Checker 6

The operation of the checker 6 when the first pipe 7 is coupled and when the first pipe 7 is to be removed will be described with reference to FIGS. 16 to 20.

Figure 16A:
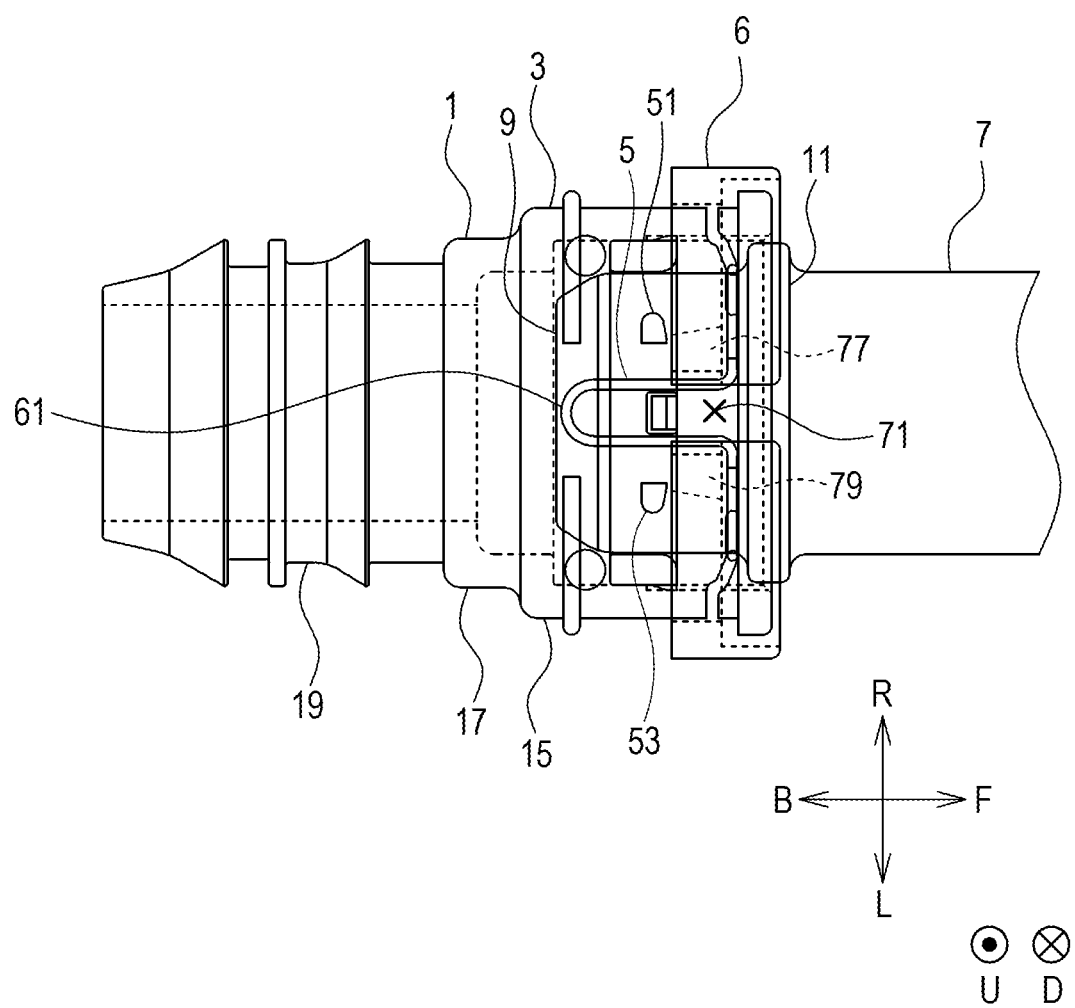
FIGS. 16A and 16B are explanatory views illustrating the connector when the first pipe is inserted into the insertion hole and the bulge portion is not yet in contact with the first leg portion and the second leg portion.
Figure 16B:
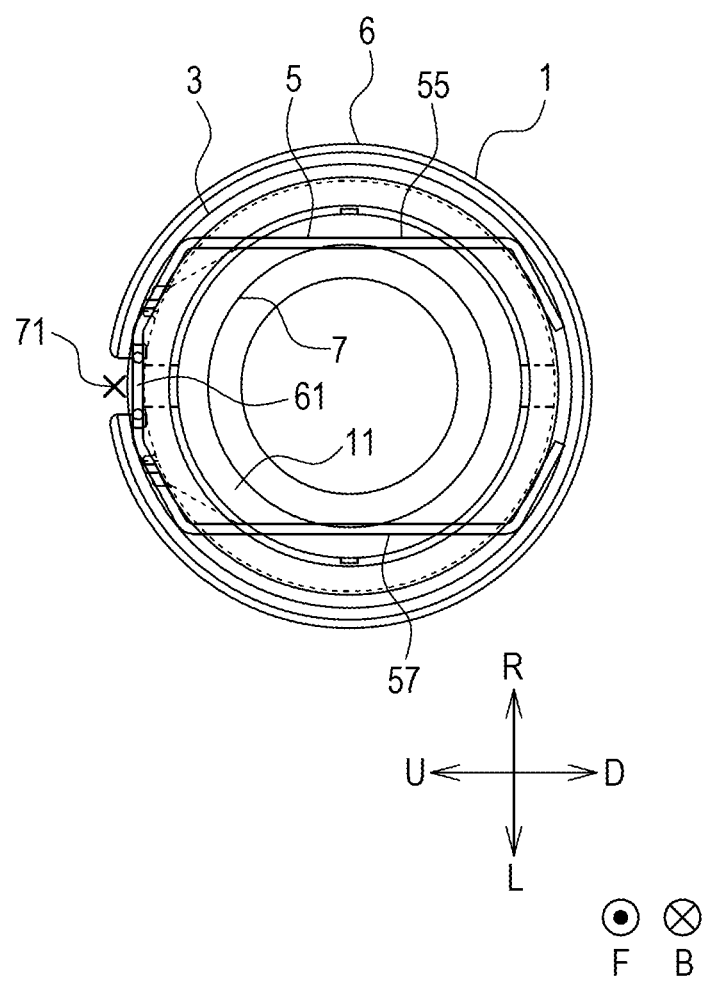

The state illustrated in FIGS. 16A and 16B is a state where the first pipe 7 is inserted into the insertion hole 29, and the bulge portion 11 is not yet in contact with the first leg portion 55 and the second leg portion 57. At this time, the state of the retainer 5 is the basic state.

The checker 6 is externally inserted to the large-diameter portion 15 in a portion on the side of the axial forward direction F. The cover portion 75 is on the side of the axial forward direction F relative to the body portion 73. The elastic deformation portion 61 is inserted into the ring split portion 71. Since no elastic deformation in the open manner occurs in the elastic deformation portion 61, the ring split portion 71 is not expanded as illustrated in FIGS. 16A, 16B, 20A, and 20B.

The positions of the projection portions 51 and 53 in the circumferential direction of the large-diameter portion 15 are shifted from the positions of the grooves 77 and 79. Even if a force in the axial backward direction B is applied to the checker 6, the projection portions 51 and 53 are brought into contact with the body portion 73, so that the checker 6 cannot move in the axial backward direction B. The projection portions 51 and 53 and the grooves 77 and 79 correspond to movement regulation portions.

Figure 17A:
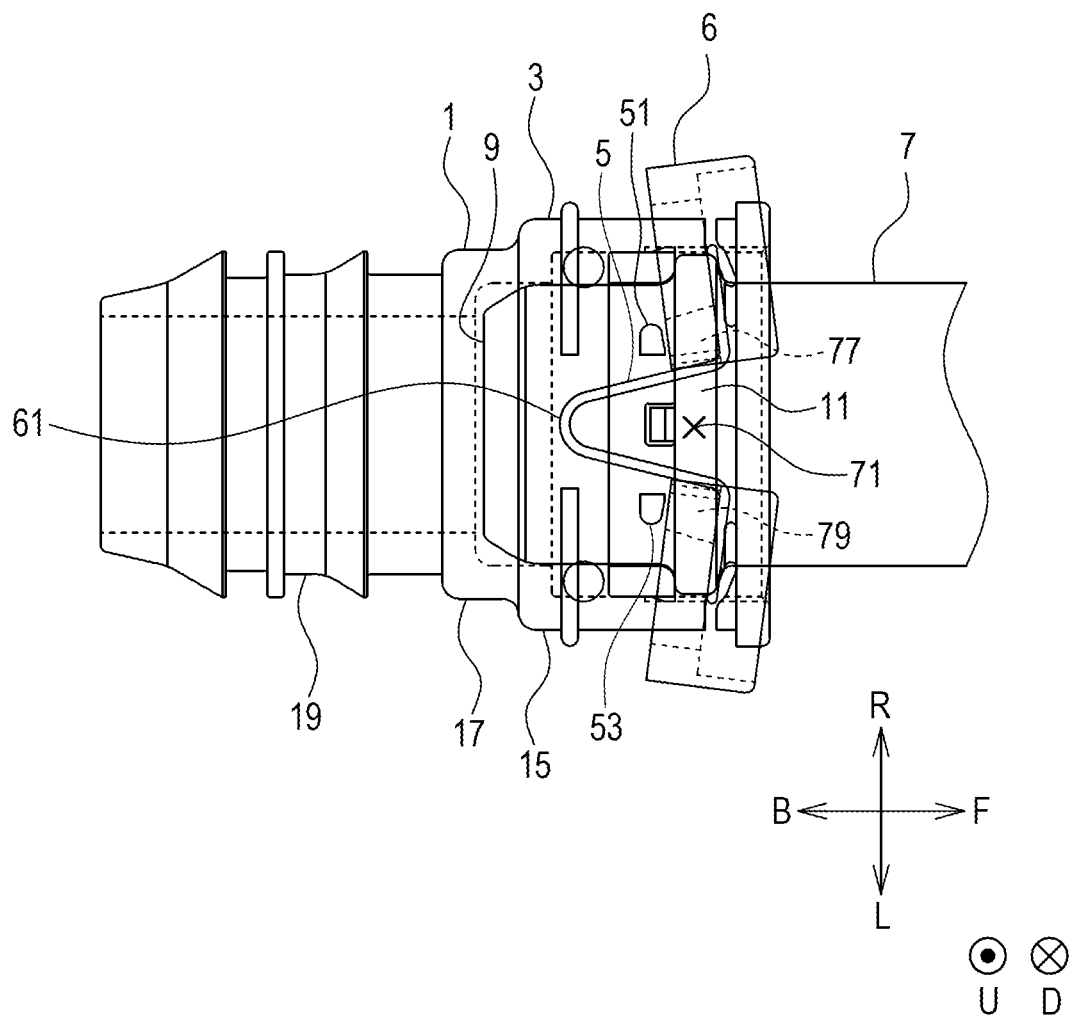
FIGS. 17A and 17B are explanatory views illustrating the connector when the bulge portion applies a force to the retainer to increase the distance.
Figure 17B:
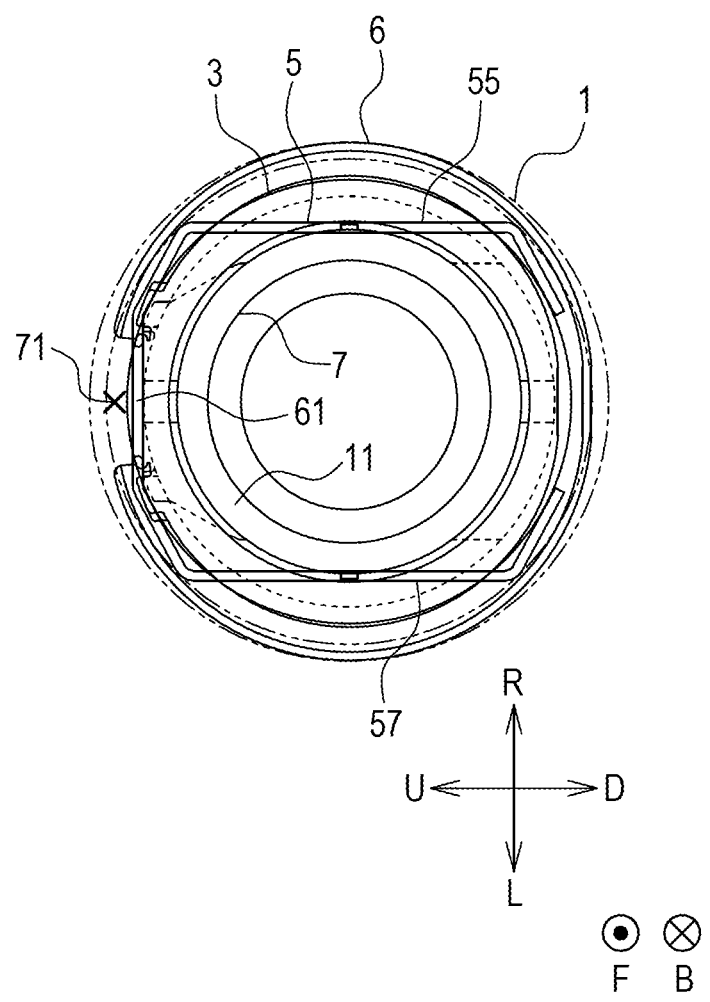

When the first pipe 7 is further deeply inserted from the state illustrated in FIGS. 16A and 16B, the state becomes the state illustrated in FIGS. 17A and 17B. The elastic deformation portion 61 has an expansion deformation and the width W increases. As a result, as illustrated in FIGS. 17A, 17B, 20C, and 20D, the checker 6 is elastically deformed such that the ring split portion 71 is enlarged.

The end surfaces 82 and 84 facing the ring split portion 71 are pressed against the elastic deformation portion 61 by the restoring force generated by elastic deformation, and receive a reaction force from the elastic deformation portion 61. As illustrated in FIG. 17A, since the elastic deformation portion 61 has a shape in which the width W is narrower as the measurement position of the width W is directed to the axial backward direction B, the reaction force includes a component of the axial backward direction B. As a result, the checker 6 is biased in the axial backward direction B. The axial backward direction B corresponds to the axial direction of the insertion hole 29.

In the state illustrated in FIGS. 17A and 17B, the positions of the projection portions 51 and 53 in the circumferential direction of the large-diameter portion 15 coincide with the positions of the grooves 77 and 79. Therefore, the checker 6 biased in the axial backward direction B can move in the axial backward direction B. When the checker 6 moves, the projection portions 51 and 53 pass through in the grooves 77 and 79.

When the projection portions 51 and 53 pass through in the grooves 77 and 79, the side surfaces 81 and 83 are pressed against the projection portions 51 and 53, and receive the reaction force from the projection portions 51 and 53. Since the side surfaces 81 and 83 are inclined as described above, the reaction force includes a component of the axial backward direction B. As a result, the checker 6 is more strongly biased in the axial backward direction B.

Figure 18A:
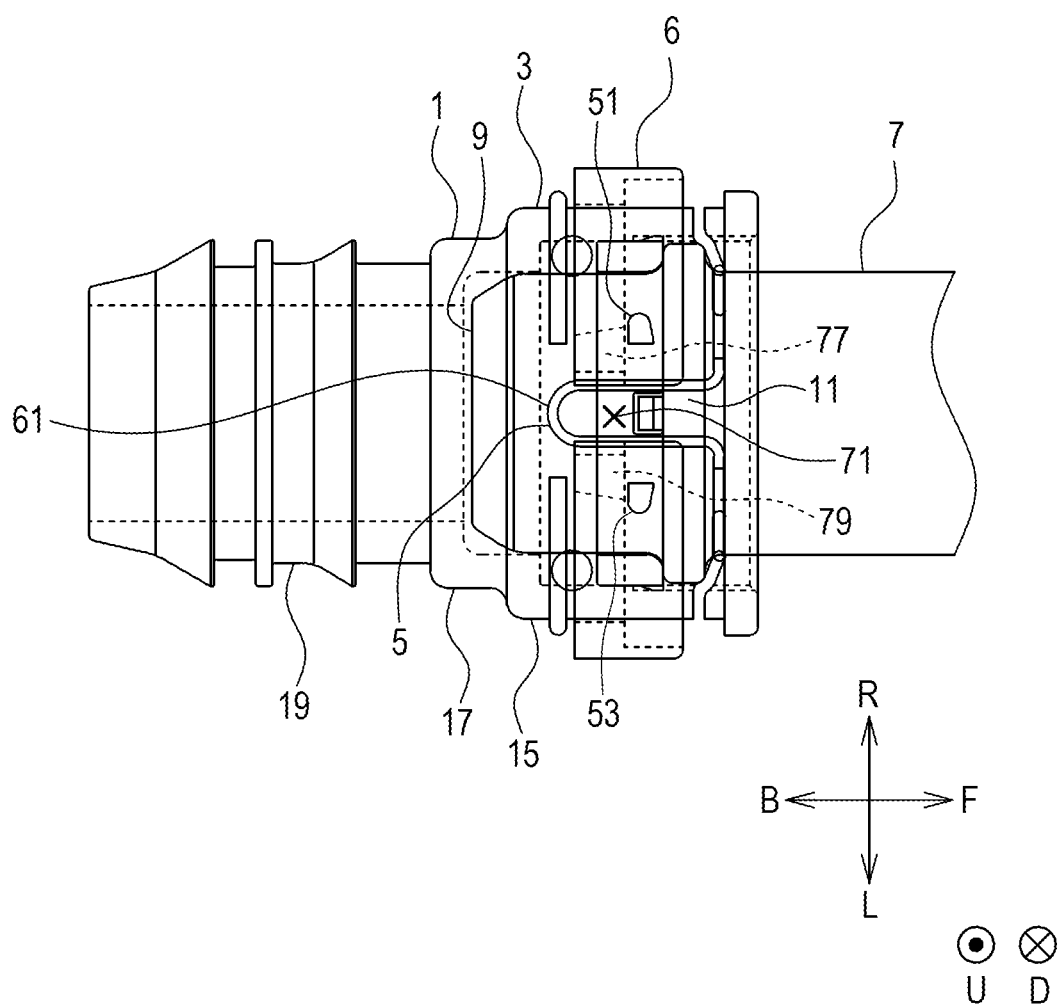
FIGS. 18A and 18B are explanatory views illustrating the connector coupled to the first pipe.
Figure 18B:
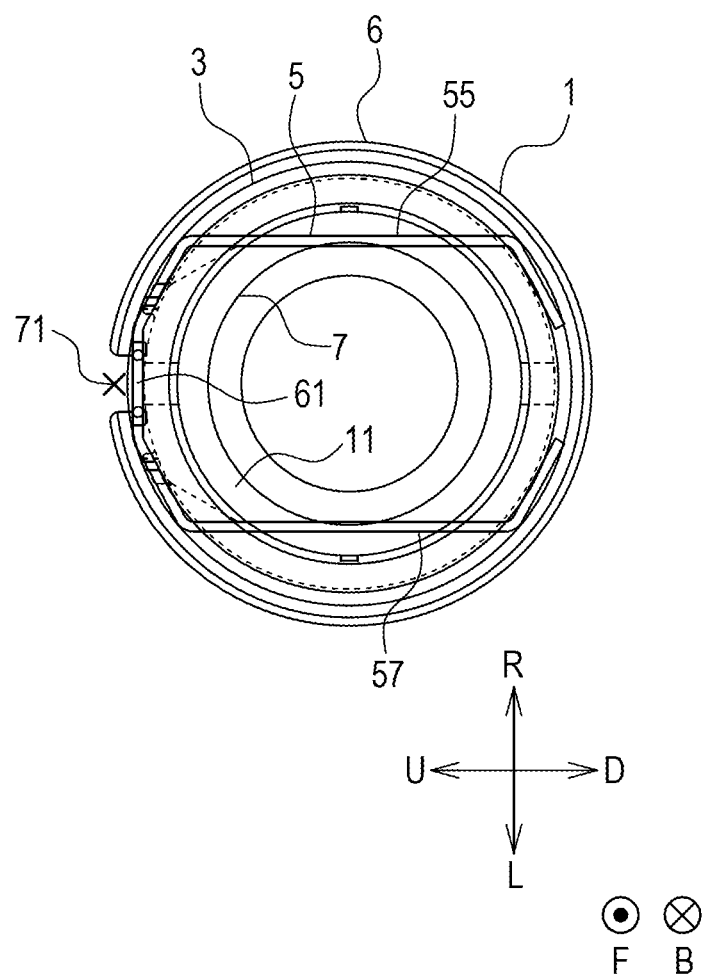

FIGS. 18A and 18B illustrate a state where coupling of the first pipe 7 is completed. The checker 6 is moved in the axial backward direction B compared to that before the first pipe 7 is coupled. The retainer 5 returns to the basic state, and the width W has become small. Therefore, the ring split portion 71 has been reduced. Since the ring split portion 71 is reduced, the positions of the projection portions 51 and 53 in the circumferential direction of the large-diameter portion 15 are shifted from the positions of the grooves 77 and 79. As a result, even if a force in the axial forward direction F is applied to the checker 6, the checker 6 does not move.

Figure 19A:
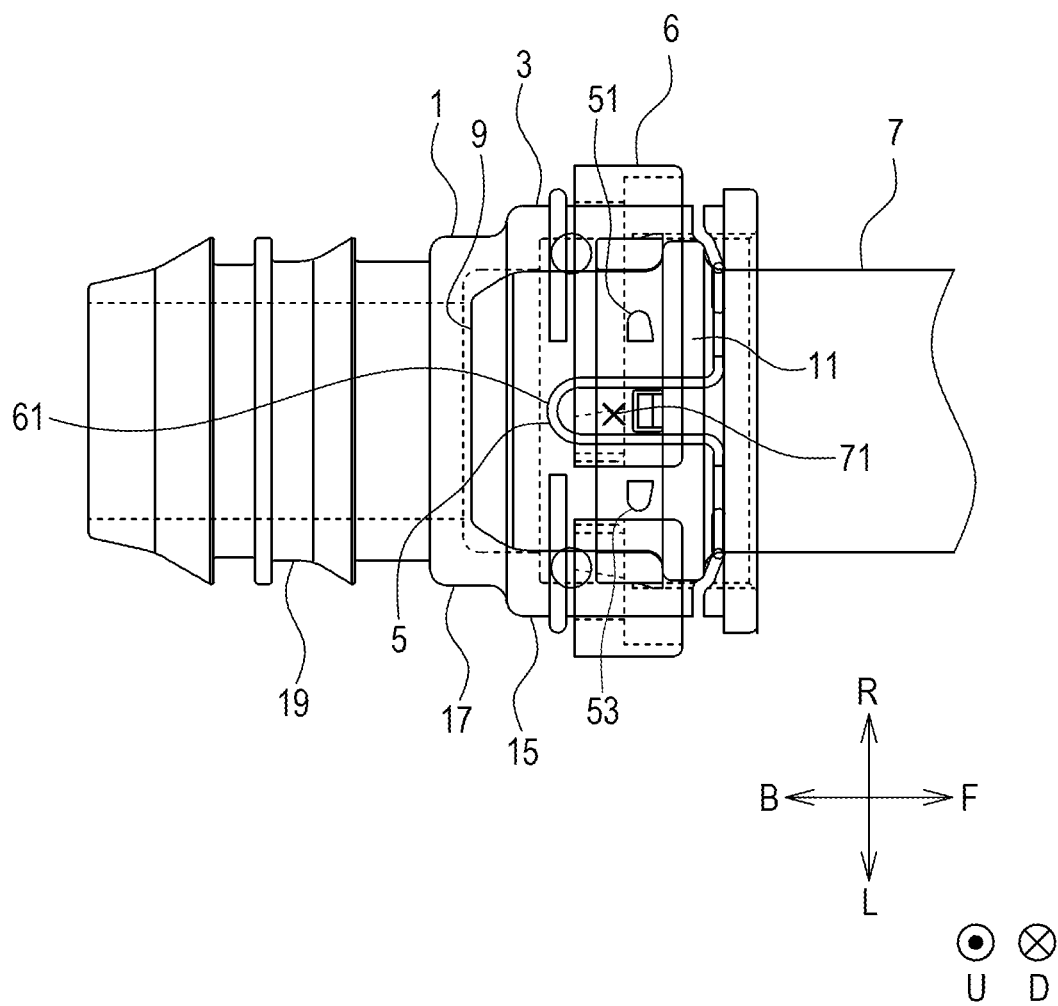
FIGS. 19A and 19B are explanatory views illustrating a state of the connector when the checker is rotated.
Figure 19B:
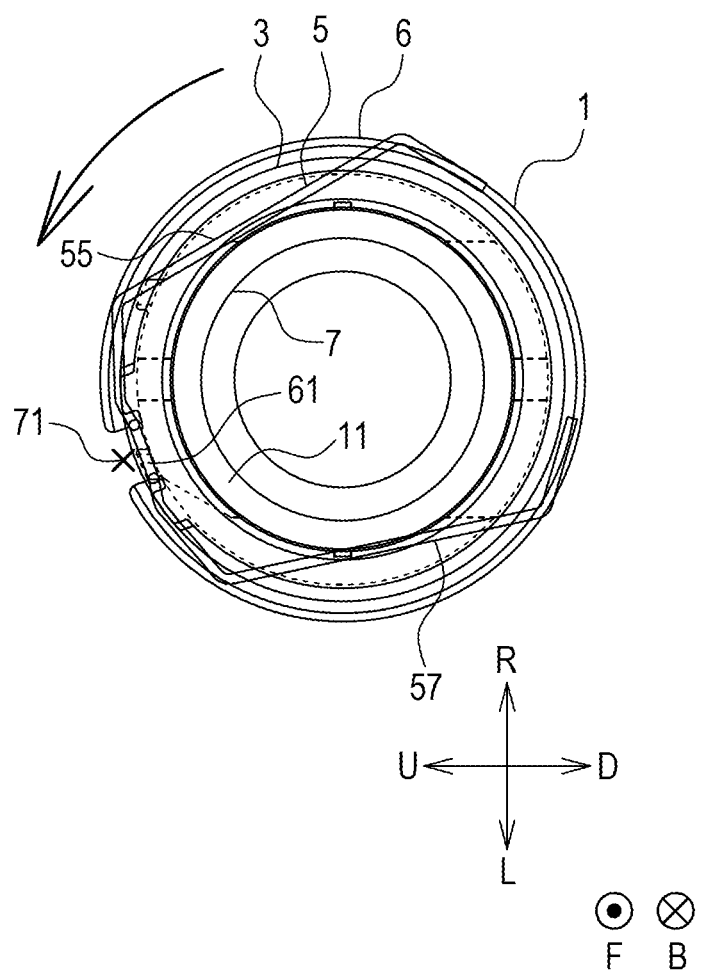
Figure 20A:
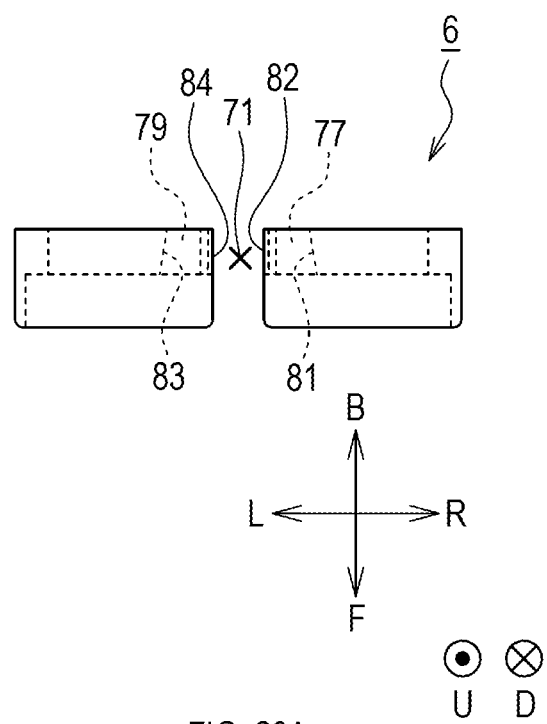
FIGS. 20A and 20B are explanatory views illustrating the checker when the bulge portion does not apply a force to the retainer.
Figure 20B:
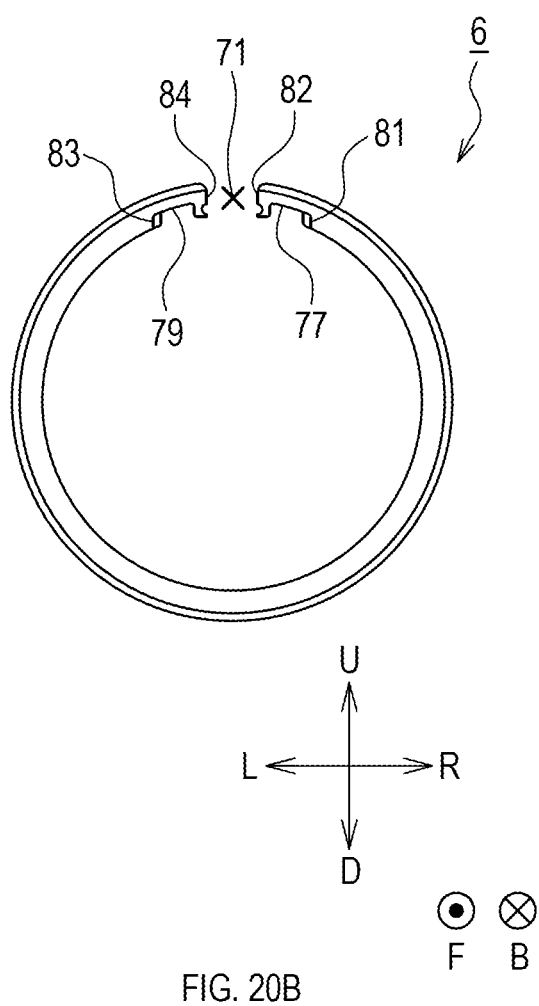
Figure 20C:
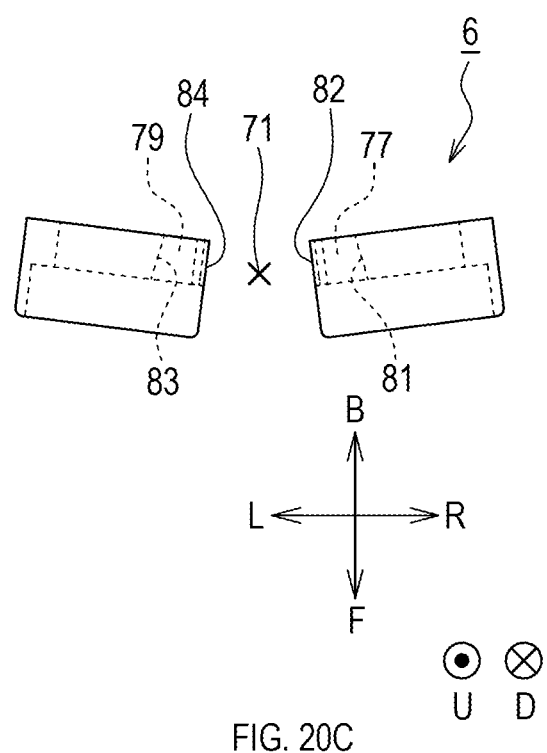
FIGS. 20C and 20D are explanatory views illustrating the checker when the bulge portion applies a force to the retainer to increase the width.
Figure 20D:
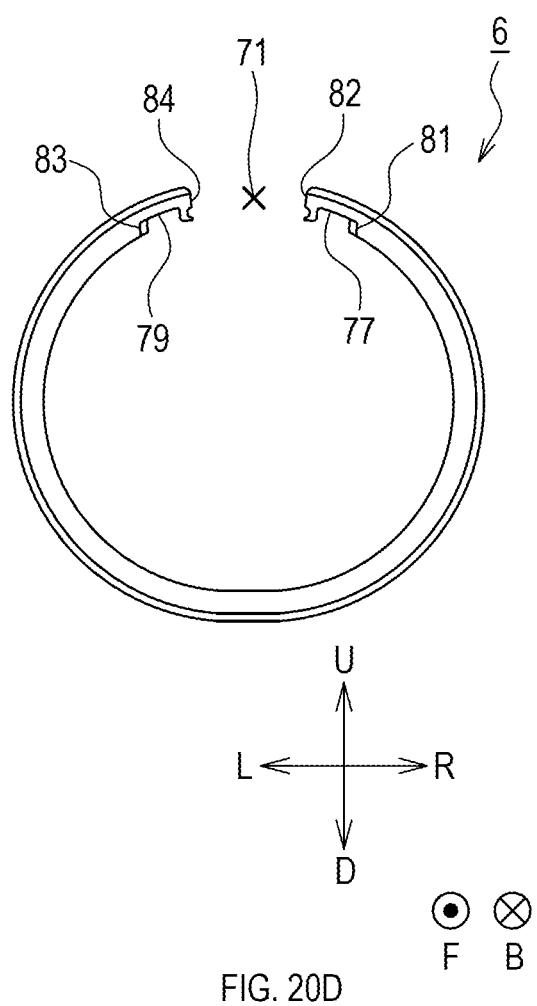

FIGS. 19A and 19B illustrate a state where the checker 6 is rotated in the circumferential direction of the large-diameter portion 15 in a state where the first pipe 7 is coupled to the connector 1. Since the elastic deformation portion 61 is inserted into the ring split portion 71, the retainer 5 rotates together with the checker 6. At this time, as illustrated in FIG. 19B, the distance between the first leg portion 55 and the second leg portion 57 becomes wider than the bulge portion 11. As a result, it becomes possible to remove the first pipe 7 from the connector 1.

4. Effects Achieved by Connector 1

(1A) When the first pipe 7 is inserted into the insertion hole 29, the retainer 5 is elastically deformed in the open manner so that the distance D is widened. Therefore, the connector 1 can suppress the first leg portion 55 from rotating outward about the first connection portion 55A. The connector 1 can suppress the second leg portion 57 from rotating outward about the second connection portion 57A. Therefore, the connector 1 can suppress the retainer 5 from largely protruding outward when the first pipe 7 is inserted into the insertion hole 29. As a result, the connector 1 can reduce the gap around the retainer 5.

(1B) When a force in the axial forward direction F is applied to the first pipe 7 coupled to the connector 1, the first regulation surfaces 101 and 103 and the second regulation surfaces 105 and 107 do not guide the first leg portion 55 and the second leg portion 57 in a direction where the distance D is widened. Therefore, even if a force in the axial forward direction F is applied to the first pipe 7 coupled to the connector 1, the first pipe 7 hardly disengages from the connector 1.

(1C) The connector 1 includes the checker 6. The position of the checker 6 is different between before and after the first pipe 7 is coupled to the connector 1. Therefore, the user can see whether or not the first pipe 7 is coupled to the connector 1 by looking at the position of the checker 6. The user can easily remove the first pipe 7 from the connector 1 by rotating the checker 6.

Other Embodiments

Although embodiments of the present disclosure have been described above, the present disclosure is not limited to the above-described embodiments, and can be carried out in various modifications.

(1) A function of one component in each of the above embodiments may be shared by a plurality of components, or a function of a plurality of components may be exerted by one component. A part of the configuration of each of the above embodiments may be omitted. At least a part of the configuration of each of the above embodiments may be added to, replaced with, or the like with respect to the configuration of another of the above embodiments.

(2) In addition to the connector 1 described above, the present disclosure can be achieved in various forms such as a system with the connector 1 as a component and a manufacturing method of the connector 1.

The invention claimed is:

1. A connector comprising a connector body, a retainer, and a checker and configured to couple a first pipe having a bulge portion and a second pipe, wherein
the connector body includes
an insertion hole into which the first pipe is inserted,
a first opening portion communicating with the insertion hole from an outer peripheral surface of the connector body, and
a second opening portion communicating with the insertion hole from the outer peripheral surface of the connector body and opposing the first opening portion,
the retainer includes
a first leg portion that is inserted into the first opening portion and configured to abut on a portion on a front side relative to the bulge portion in an outer peripheral surface of the coupled first pipe to regulate disengagement of the first pipe,
a second leg portion that is inserted into the second opening portion and configured to abut on the portion on the front side relative to the bulge portion in the outer peripheral surface of the coupled first pipe to regulate disengagement of the first pipe, and
an intermediate portion that connects a first connection portion in the first leg portion and a second connection portion in the second leg portion and is elastically deformable in an open manner so that a distance between the first connection portion and the second connection portion is widened,
an end surface of the first opening portion includes a first guide surface that guides the first leg portion in a direction where the distance is widened when a force in an insertion direction of the first pipe is applied to the first leg portion,
an end surface of the second opening portion includes a second guide surface that guides the second leg portion in a direction where the distance is widened when a force in the insertion direction is applied to the second leg portion,
when the first pipe is inserted into the insertion hole, the first leg portion to which the force in the insertion direction is applied by the bulge portion is guided by the first guide surface, and the second leg portion to which the force in the insertion direction is applied by the bulge portion is guided by the second guide surface, so that a distance between the first leg portion and the second leg portion becomes a distance that permits passage of the bulge portion,
the checker includes a C shape form having a ring split portion, the checker being elastically deformable to enlarge the ring split portion and externally inserted to the connector body,
the intermediate portion is elastically deformable to change in width, the intermediate portion includes an elastic deformation portion inserted into the ring split portion, the elastic deformation portion has a shape in which, at least when the width is enlarged, the width becomes narrower as a measurement position of the width goes in an axial direction of the insertion hole, the checker is configured to be elastically deformed such that the ring split portion is enlarged by an increase in the width when the first pipe is inserted into the insertion hole, and to be biased in the axial direction by a restoring force generated by elastic deformation, and the connector further includes a movement regulation portion that regulates movement of the checker in the axial direction when the first pipe is not inserted into the insertion hole, and that permits movement of the checker in the axial direction when the first pipe is inserted into the insertion hole and the ring split portion is enlarged.

2. The connector according to claim 1, wherein the end surface of the first opening portion is configured not to guide the first leg portion in a direction where the distance is widened when a force in a disengagement direction of the first pipe is applied to the first leg portion, and the end surface of the second opening portion is configured not to guide the second leg portion in a direction where the distance is widened when a force in the disengagement direction is applied to the second leg portion.

* * * * *